US008916647B2

(12) United States Patent
Zuercher et al.

(10) Patent No.: US 8,916,647 B2
(45) Date of Patent: Dec. 23, 2014

(54) CROSSLINKED FILMS AND ARTICLES PREPARED FROM THE SAME

(75) Inventors: Karl Zuercher, Samstagern (CH); Stefan Ultsch, Stafa (CH)

(73) Assignee: Dow Global Technologies LLC, Midland, MI (US)

( * ) Notice: Subject to any disclaimer, the term of this patent is extended or adjusted under 35 U.S.C. 154(b) by 466 days.

(21) Appl. No.: 13/003,782

(22) PCT Filed: Jul. 13, 2009

(86) PCT No.: PCT/US2009/050348
§ 371 (c)(1),
(2), (4) Date: Jan. 12, 2011

(87) PCT Pub. No.: WO2010/009024
PCT Pub. Date: Jan. 21, 2010

(65) Prior Publication Data
US 2011/0117318 A1    May 19, 2011

Related U.S. Application Data

(60) Provisional application No. 61/080,830, filed on Jul. 15, 2008.

(51) Int. Cl.
| *C08F 8/00* | (2006.01) |
| *C08L 23/06* | (2006.01) |
| *B32B 27/32* | (2006.01) |
| *C08L 23/20* | (2006.01) |
| *C08L 23/04* | (2006.01) |
| *C08L 23/16* | (2006.01) |
| *B32B 3/26* | (2006.01) |
| *C08J 3/28* | (2006.01) |
| *B32B 27/08* | (2006.01) |
| *C08J 5/18* | (2006.01) |
| *C08L 23/10* | (2006.01) |
| *C08L 23/14* | (2006.01) |
| *C08L 23/12* | (2006.01) |

(52) U.S. Cl.
CPC .............. *B32B 27/32* (2013.01); *C08J 2323/02* (2013.01); *C08L 23/20* (2013.01); *C08L 23/10* (2013.01); *C08L 23/04* (2013.01); *C08L 23/142* (2013.01); *C08L 23/16* (2013.01); *C08L 23/12* (2013.01); *B32B 3/266* (2013.01); *C08J 3/28* (2013.01); *B32B 27/08* (2013.01); *C08J 5/18* (2013.01)
USPC ............................ 525/191; 525/232; 525/240

(58) Field of Classification Search
USPC ......................... 525/191, 240, 232
See application file for complete search history.

(56) References Cited

U.S. PATENT DOCUMENTS

| 4,044,187 A | 8/1977 | Kremkau |
| 4,064,296 A | 12/1977 | Bornstein et al. |
| 4,240,993 A | 12/1980 | Sun |
| 4,246,709 A | 1/1981 | Selleslags |
| 4,283,630 A | 8/1981 | Fowler |
| 4,391,862 A | 7/1983 | Bornstein et al. |
| 4,448,792 A | 5/1984 | Schirmer |
| 4,797,235 A | 1/1989 | Garland et al. |
| 4,851,290 A | 7/1989 | Vicik |
| 4,957,790 A | 9/1990 | Warren |
| 5,055,328 A | 10/1991 | Evert et al. |
| 5,298,302 A | 3/1994 | Boice |
| 5,922,811 A | 7/1999 | Suzuki et al. |
| 5,993,922 A * | 11/1999 | Babrowicz et al. .......... 428/35.7 |
| 6,869,993 B2 | 3/2005 | Watanabe et al. |
| 7,622,529 B2 * | 11/2009 | Walton et al. ................. 525/191 |
| 7,671,131 B2 * | 3/2010 | Hughes et al. ................ 525/191 |
| 2006/0000545 A1 | 1/2006 | Nageli et al. |
| 2006/0003120 A1 | 1/2006 | Nageli et al. |
| 2006/0003122 A1 | 1/2006 | Nageli et al. |
| 2006/0003123 A1 | 1/2006 | Nageli et al. |
| 2008/0202075 A1 | 8/2008 | Kronawittleithner et al. |
| 2009/0277577 A1 | 11/2009 | Bohm et al. |
| 2010/0075079 A1 | 3/2010 | Bernal-Lara et al. |

FOREIGN PATENT DOCUMENTS

| EP | 0111102 A1 | 6/1984 |
| EP | 0577432 A1 | 1/1994 |
| EP | 0597502 A2 | 5/1994 |
| EP | 1216146 A2 | 6/2002 |
| EP | 1614528 A1 | 1/2006 |
| GB | 1383556 A | 2/1974 |
| GB | 1480204 A | 7/1977 |
| GB | 2082109 A | 3/1982 |
| GB | 2083403 A | 3/1982 |
| GB | 2099755 A | 12/1982 |
| GB | 2200323 A | 8/1988 |
| GB | 2233934 A | 1/1991 |
| JP | 1286841 A | 11/1989 |
| JP | 3026542 A | 2/1991 |
| WO | 9532095 A1 | 11/1995 |
| WO | 9623390 A1 | 8/1996 |

(Continued)

OTHER PUBLICATIONS

PCT/US2009/050348 Intl Preliminary Report on Patentability.

(Continued)

*Primary Examiner* — Nathan M Nutter

(57) ABSTRACT

The invention provides cross-linked polymeric films, laminates, membranes or other polymeric articles, which show rubber like heat resistance (hot set) and dimensional stability above the polymer melting point, while maintaining heat sealing properties. For example, the invention provides a film comprising at least one layer formed from a composition comprising the following components: A) at least one polymer selected from the group consisting of the following: i) an ethylene-based polymer, ii) an ethylene/α-olefin/diene interpolymer, and ii) a C4-C10 olefin-based polymer; B) at least one polymer selected from the group consisting of a propylene/ethylene interpolymer and a propylene/&alpha,- -olefin interpolymer; and wherein the film is crosslinked using radiation and/or chemicals.

15 Claims, 5 Drawing Sheets

(56) References Cited

FOREIGN PATENT DOCUMENTS

| | | |
|---|---|---|
| WO | 9633923 A1 | 10/1996 |
| WO | 9638288 A1 | 12/1996 |
| WO | 9722536 A1 | 6/1997 |
| WO | 9738857 A1 | 10/1997 |
| WO | 9808891 A1 | 3/1998 |
| WO | 9818841 A2 | 5/1998 |
| WO | 9832795 A1 | 7/1998 |
| WO | 01/70877 A2 | 9/2001 |
| WO | 0224803 A1 | 3/2002 |
| WO | 2005/056670 | 6/2005 |
| WO | 2006031172 A1 | 3/2006 |
| WO | 2006124396 A2 | 11/2006 |
| WO | 2007008753 A1 | 1/2007 |
| WO | 2010/009024 A2 | 1/2010 |

OTHER PUBLICATIONS

PCT/US2009/050348 Intl Search Report.
PCT/US2009/050348 Written Opinion.

\* cited by examiner

CROSSLINKED FILMS AND ARTICLES PREPARED FROM THE SAME

REFERENCE TO RELATED APPLICATIONS

This application claims the benefit of U.S. Provisional Application No. 61/080,830 filed on Jul. 15, 2008, and fully incorporated herein by reference.

BACKGROUND

The invention provides cross-linked polymeric films, laminates, membranes or other polymeric articles, which show rubber like heat resistance (hot set) and dimensional stability above the polymer melting point, while maintaining heat sealing properties.

Thermoplastic films or articles are limited in their use at elevated temperatures, due to the respective melting behavior of their polymeric components. Thermoplastics are typically cross-linked to improve their thermal resistance, making them usable above their melting temperature. However, heat sealing properties and welding properties are lost when the polymer is cross-linked.

U.S. Pat. No. 4,851,290 discloses an irradiated three layer thermoplastic film comprising a nylon 6.12 or nylon 6.66 core layer, and outer layers comprising a blend of 50-75 percent polyethylene or EVA, and 25-50 percent of a polyethylene-modified adhesive or EVA-modified adhesive.

U.S. Pat. No. 5,055,328 discloses a tubular article formed of multilayer, differentially cross-linked heat sealable film. The multilayer film contains at least two layers, an inner layer and an outer layer. The inner layer is a heat sealable layer containing an antioxidant cross-linking inhibitor, in an amount sufficient to inhibit the cross-linking of that layer by irradiation. Upon exposure of the multilayer film to radiation, the outer layer is cross-linked to a greater extent than the first heat sealable layer.

European Patent Application EP0597502A2 discloses a heat-shrinkable, thermoplastic film or bag, which contains at least one homogeneous ethylene alpha-olefin copolymer having a density of at least 0.90 g/cc. Oriented films are disclosed as having improved optics and improved impact resistance. A homogeneous ethylene alpha-olefin copolymer may be present in a monolayer film, either alone, or in a blend, or may be included in one or more layers of a multilayer film.

United Kingdom Patent Application GB 1480204 discloses a laminated polymeric film comprising the following: (a) a film of nylon, (b) a film of a mono-alpha olefin polymer which is cross-linkable by radiation, and (c) an adhesive layer, comprising an organic polymer, disposed between these films, the polymer having cross-linkable olefin-derived units as the major component thereof. The laminated assembly is cross-linked to an extent equivalent to a radiation dosage absorbed by at least 6 Megarads for each of the specified films (a) and (b) and layer (c). The nylon may be polycaproamide, polyhexamethylene adipamide, polyhexamethylene sebacamide, polycaprylamide, polyundecanoamide or polydodecanamide. The mono-alpha olefin polymer may be polyethylene, polypropylene, polybutene-1, or an ethylene/vinylacetate copolymer. The polymeric adhesive may be a homopolymer, a copolymer, a terpolymer, a block copolymer, a graft copolymer, or an ionomeric copolymer.

International Publication No. WO 2006/031172 discloses a strip tape having the following layers: a first layer with an outwardly facing surface of polypropylene (PP); a first adhesive layer, a core layer of an oxygen barrier polymer, a second adhesive layer, a second layer with an outwardly facing surface of polypropylene (PP).

Additional films, articles, and/or rheology modified compositions are disclosed in the following references: EP 0577432A1, U.S. Pat. No. 4,283,630, GB 2233934A, U.S. Pat. No. 4,064,296, GB 2099755A, U.S. Pat. No. 4,240,993, GB 1383556, U.S. Pat. No. 4,246,709, GB 2083403A, WO 96/33923, WO 97/22536, US 2006/0003123, US 2006/0000545, US 2006/0032120, US 2006/0003122, EP 1216146B1, WO 96/38288, WO 98/18841, WO 95/32095, WO 98/32795, WO 02/24803, WO 05/056670, and WO 06/124396.

None of the conventional art provides for polymeric films and articles that have characteristics of a thermoset/crosslinked article, while maintaining weldability and sealability. Thus, there is a need for polymeric films and articles, which are dimensionally stable above the polymer melting point, and which maintain heat sealing and/or welding properties. In particular, there is a need for crosslinked films with thermoset heat resistance (no melting), improved mechanical properties, and improved puncture resistance. There is a further need for such crosslinked films that maintain heat sealing properties and heat welding properties, while maintaining dimensional stability during the sealing or welding step. There is an additional need for crosslinked films with a broad and reliable heat sealing window, and which can be used in high temperature filling and processing applications, in heat or radiation sterilization, and in stretch film and shrink film applications. Some of these needs and others have been met by the following invention.

SUMMARY OF THE INVENTION

The invention provides a film comprising at least one layer formed from a composition comprising the following components:

A) at least one polymer selected from the group consisting of the following:
  i) an ethylene-based polymer,
  ii) an ethylene/α-olefin/diene interpolymer, and
  ii) a C4-C10 olefin-based polymer;

B) at least one polymer selected from the group consisting of a propylene/ethylene interpolymer and a propylene/α-olefin interpolymer; and wherein the film is crosslinked using radiation and/or chemicals.

The invention also provides a film comprising at least one layer formed from a composition comprising at least one polymer selected from the group consisting of a propylene/ethylene interpolymer and a propylene/α-olefin interpolymer; and wherein the propylene/ethylene interpolymer comprises from 70 to 96 weight percent polymerized propylene, based on the total weight of interpolymer, and from 4 to 30 weight percent polymerized ethylene, based on the total weight of interpolymer; and wherein the propylene/α-olefin interpolymer comprises from 70 to 96 weight percent polymerized propylene, based on the total weight of interpolymer, and from 4 to 30 weight percent polymerized α-olefin, based on the total weight of interpolymer; and wherein the film is crosslinked using radiation and/or chemicals.

The invention also provides a perforated film, comprising at least three layers, an inner layer and two outer layers, and wherein at least one layer formed from a composition comprising at least one polymer selected from the group consisting of a propylene/ethylene interpolymer and a propylene/α-olefin interpolymer; and wherein, when the film is exposed to an elevated temperature, the at least one inner layer softens or melts to such an extent, that upon exposure to a compression force, a sufficient number of perforations are sealed in the inner layer, to impart an increased moisture barrier to the film composition, and wherein, the layers of the film composition have perforations with a common center, and wherein the film is crosslinked using radiation and/or chemicals.

The invention also provides a film comprising at least one layer formed from a composition comprising component A), and at least one layer formed from a composition comprising component B) as follows:

A) at least one polymer selected from the group consisting of the following:
  i) an ethylene-based polymer,
  ii) an ethylene/α-olefin/diene interpolymer, and
  ii) a C4-C10 olefin-based polymer;
B) at least one polymer selected from the group consisting of a propylene/ethylene interpolymer and a propylene/α-olefin interpolymer; and wherein the film is crosslinked using radiation and/or chemicals.

The invention also provides a film comprising at least one layer formed from a composition comprising the following components:

A) at least one polymer selected from the group consisting of the following:
  i) an ethylene-based polymer,
  ii) an ethylene/α-olefin/diene interpolymer, and
  ii) a C4-C10 olefin-based polymer; and wherein the film is crosslinked using radiation and/or chemicals.

DETAILED DESCRIPTION OF THE INVENTION

Figure 1:
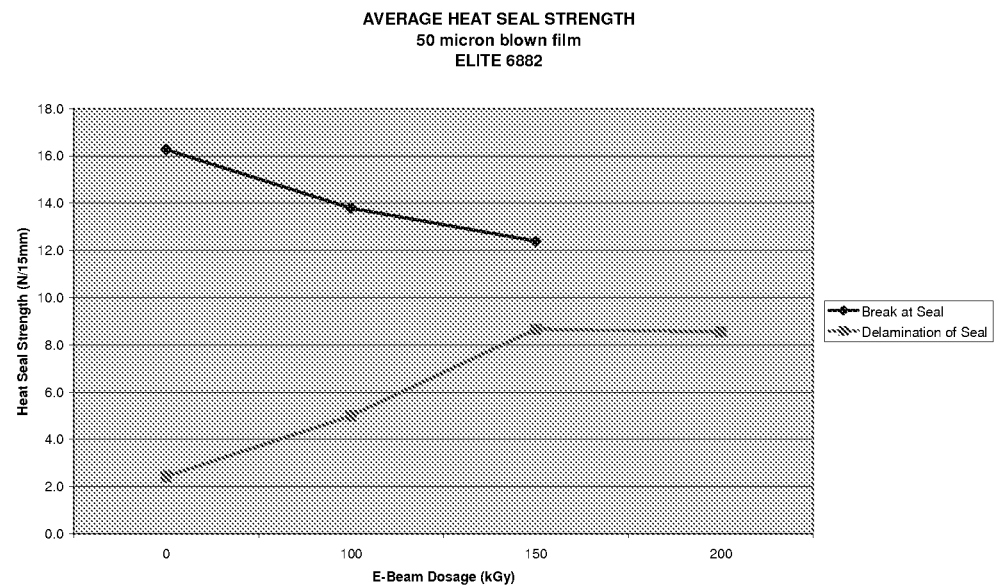
FIG. 1 depicts the Average Heat Seal Strength (as referenced by Delamination at Seal (DOS) and Break at Seal (BAS)) versus E-Beam dosage of a film formed from a composition comprising the E62 polymer.

As discussed above, the invention provides, in a first aspect, a film comprising at least one layer formed from a composition comprising the following components:

A) at least one polymer selected from the group consisting of the following:
  i) an ethylene-based polymer,
  ii) an ethylene/α-olefin/diene interpolymer, and
  ii) a C4-C10 olefin-based polymer;
B) at least one polymer selected from the group consisting of a propylene/ethylene interpolymer or a propylene/α-olefin interpolymer; and wherein the film is crosslinked using radiation and/or chemicals.

In a second aspect, the invention provides a film comprising at least one layer formed from a composition comprising at least one polymer selected from the group consisting of a propylene/ethylene interpolymer and a propylene/α-olefin interpolymer; and wherein the propylene/ethylene interpolymer comprises from 70 to 96 weight percent polymerized propylene, based on the total weight of interpolymer, and from 4 to 30 weight percent polymerized ethylene, based on the total weight of interpolymer; and wherein the propylene/α-olefin interpolymer comprises from 70 to 96 weight percent polymerized propylene, based on the total weight of interpolymer, and from 4 to 30 weight percent polymerized α-olefin, based on the total weight of interpolymer; and wherein the film is crosslinked using radiation and/or chemicals.

In a third aspect, the invention provides a perforated film, comprising at least three layers, an inner layer and two outer layers, and wherein at least one layer formed from a composition comprising at least one polymer selected from the group consisting of a propylene/ethylene interpolymer and a propylene/α-olefin interpolymer; and wherein, when the film is exposed to an elevated temperature, the at least one inner layer softens or melts to such an extent, that upon exposure to a compression force, a sufficient number of perforations are sealed in the inner layer, to impart an increased moisture barrier to the film composition, and wherein, the layers of the film composition have perforations with a common center, and wherein the film is crosslinked using radiation and/or chemicals.

In a fourth aspect, the invention provides a film comprising at least one layer formed from a composition comprising component A), and at least one layer formed from a composition comprising component B) as follows:

A) at least one polymer selected from the group consisting of the following:
  i) an ethylene-based polymer,
  ii) an ethylene/α-olefin/diene interpolymer, and
  ii) a C4-C10 olefin-based polymer;
B) at least one polymer selected from the group consisting of a propylene/ethylene interpolymer and a propylene/α-olefin interpolymer; and wherein the film is crosslinked using radiation and/or chemicals.

In a fifth aspect, the invention provides a film comprising at least one layer formed from a composition comprising the following components:

A) at least one polymer selected from the group consisting of the following:

i) an ethylene-based polymer,
ii) an ethylene/α-olefin/diene interpolymer, and
ii) a C4-C10 olefin-based polymer, and wherein the film is crosslinked using radiation and/or chemicals.

In a sixth aspect, the invention provides a perforated film, comprising at least three layers, an inner layer and two outer layers, and wherein at least one layer comprises an inventive film; and wherein, when the film is exposed to an elevated temperature, the at least one inner layer softens or melts to such an extent, that upon exposure to a compression force, a sufficient number of perforations are sealed in the inner layer, to impart an increased moisture barrier to the film composition, and wherein, the layers of the film composition have perforations with a common center, and wherein the film is crosslinked using radiation and/or chemicals.

The following embodiments refer to anyone of the above films as applicable.

In one embodiment, Component B is a propylene/ethylene interpolymer that has a density from 0.86 g/cc to 0.93 g/cc, preferably from 0.86 g/cc to 0.90 g/cc. In one embodiment, the propylene/ethylene interpolymer has a melt flow rate (MFR) from 2 g/10 min to 30 g/10 min, preferably from 5 g/10 min to 30 g/10 min. In one embodiment, the propylene/ethylene interpolymer has a melt flow rate (MFR) from 5 g/10 min to 12 g/10 min.

In one embodiment, Component B is a propylene/ethylene interpolymer, and wherein the propylene/ethylene interpolymer comprises from 70 to 96 weight percent polymerized propylene, based on the total weight of interpolymer, and from 4 to 30 weight percent polymerized ethylene, based on the total weight of interpolymer. In a further embodiment, the propylene/ethylene interpolymer has a density from 0.86 g/cc to 0.93 g/cc, preferably from 0.86 g/cc to 0.90 g/cc. In one embodiment, the propylene/ethylene interpolymer has a melt flow rate (MFR) from 2 g/10 min to 30 g/10 min, preferably from 5 g/10 min to 30 g/10 min. In one embodiment, the propylene/ethylene interpolymer has a melt flow rate (MFR) from 5 g/10 min to 12 g/10 min.

In one embodiment, Component B is a propylene/α-olefin interpolymer that has a density from 0.86 g/cc to 0.93 g/cc, preferably from 0.86 g/cc to 0.90 g/cc. In one embodiment, the propylene/α-olefin interpolymer has a melt flow rate (MFR) from 2 g/10 min to 30 g/10 min, preferably from 5 g/10 min to 30 g/10 min. In one embodiment, the propylene/α-olefin interpolymer has a melt flow rate (MFR) from 5 g/10 min to 12 g/10 min.

In one embodiment, Component B is a propylene/α-olefin interpolymer, and wherein the propylene/α-olefin interpolymer comprises from 70 to 96 weight percent polymerized propylene, based on the total weight of interpolymer, and from 4 to 30 weight percent polymerized α-olefin, based on the total weight of interpolymer. In a further embodiment, the propylene/α-olefin interpolymer has a density from 0.86 g/cc to 0.93 g/cc, preferably from 0.86 g/cc to 0.90 g/cc. In one embodiment, the propylene/α-olefin interpolymer has a melt flow rate (MFR) from 2 g/10 min to 30 g/10 min, preferably from 5 g/10 min to 30 g/10 min. In one embodiment, the propylene/α-olefin interpolymer has a melt flow rate (MFR) from 5 g/10 min to 12 g/10 min.

In one embodiment, Component B is present in an amount from 5 to 50 weight percent, preferably from 10 to 40 weight percent, based on the total weight of the composition.

In one embodiment, Component A is present in an amount from 50 to 95 weight percent, based on the total weight of the composition. In one embodiment, Component A is present in an amount from 60 to 95 weight percent, based on the total weight of the composition. In one embodiment, Component A is present in an amount from 70 to 95 weight percent, based on the total weight of the composition.

In one embodiment, Component A is present in an amount from greater than 50 weight percent, based on the total weight of the composition, and Component B is present in an amount from less than 50 weight percent, based on the total weight of the composition.

In one embodiment, Component A is present in an amount from 50 to 60 weight percent, based on the total weight of the composition, and Component B is present in an amount from 40 to 50 weight percent, based on the total weight of the composition.

In one embodiment, Component A is an ethylene-based polymer. In one embodiment, Component A has a density from 0.850 g/cc to 0.965 g/cc. In one embodiment, Component A has a density from 0.900 g/cc to 0.955 g/cc. In one embodiment, Component A has a density from 0.910 g/cc to 0.950 g/cc. In one embodiment, Component A has a melt index (I2) from 0.5 g/10 min to 40 g/10 min. In one embodiment, Component A has a melt index (I2) from 0.5 g/10 min to 10 g/10 min. In one embodiment, Component A has a melt index (I2) from 0.5 g/10 min to 5 g/10 min.

In one embodiment, Component A is an ethylene/α-olefin/diene interpolymer. In one embodiment, ethylene/α-olefin/diene interpolymer has a density from 0.85 g/cc to 0.91 g/cc. In one embodiment, ethylene/α-olefin/diene interpolymer has a density from 0.86 g/cc to 0.90 g/cc. In one embodiment, ethylene/α-olefin/diene interpolymer has a melt index (I2) from 0.5 g/10 min to 40 g/10 min. In one embodiment, ethylene/α-olefin/diene interpolymer has a melt index from 0.5 g/10 min to 10 g/10 min. In one embodiment, ethylene/α-olefin/diene interpolymer has a melt index from 0.5 g/10 min to 5 g/10 min.

In one embodiment, Component A is a C4-C10 olefin-based polymer.

In one embodiment, Component A and Component B comprise greater than 40 weight percent, preferably greater than 50 weight percent of the total weight of the film.

In one embodiment, Component A and Component B comprise greater than 80 weight percent, preferably greater than 90 weight percent of the total weight of the film.

In one embodiment, for the second or third aspect of the invention, the polymer is a propylene/ethylene interpolymer. In one embodiment, the propylene/ethylene interpolymer has a density from 0.86 g/cc to 0.93 g/cc. In one embodiment, the propylene/ethylene interpolymer has a density from 0.86 g/cc to 0.90 g/cc. In one embodiment, the propylene/ethylene interpolymer has a melt flow rate (MFR) from 5 g/10 min to 30 g/10 min. In one embodiment, the propylene/ethylene interpolymer has a melt flow rate (MFR) from 5 g/10 min to 12 g/10 min.

In one embodiment, for the second or third aspect of the invention, the polymer is a propylene/α-olefin interpolymer. In one embodiment, the propylene/α-olefin interpolymer has a density from 0.86 g/cc to 0.93 g/cc. In one embodiment, the propylene/α-olefin interpolymer has a density from 0.86 g/cc to 0.90 g/cc. In one embodiment, the propylene/α-olefin interpolymer has a melt flow rate (MFR) from 5 g/10 min to 30 g/10 min. In one embodiment, the propylene/α-olefin interpolymer has a melt flow rate (MFR) from 5 g/10 min to 12 g/10 min.

In one embodiment, a composition further comprises at least one additive. In a further embodiment, the at least one additive is selected from the group consisting of fillers, flame retardants, colorants, stabilizers, processing aids, and combinations thereof.

In one embodiment, a composition further comprises a filler. In a further embodiment, the filler is selected from calcium carbonate, aluminum-trihydrate, magnesium-hydroxite, bariumsulfate, talc or silica.

In one embodiment, a composition, and preferably a film composition of the first aspect, further comprises a second ethylene-based polymer. In one embodiment, the second ethylene-based polymer has a density from 0.85 g/cc to 0.91 g/cc. In one embodiment, the second ethylene-based polymer has a density from 0.86 g/cc to 0.90 g/cc. In one embodiment, the second ethylene-based polymer has a melt index (I2) from 0.5 g/10 min to 40 g/10 min. In one embodiment, the second ethylene-based polymer has a melt index (I2) from 0.5 g/10 min to 20 g/10 min. In one embodiment, the second ethylene-based polymer has a melt index (I2) from 0.5 g/10 min to 5 g/10 min.

In one embodiment, the film is crosslinked using electron beam radiation at a dosage from 5 kGy to 400 kGy (1 kGy=1 kJ/kg=0.1 MRAD). In a further embodiment, the radiation dosage is from 50 kGy to 200 kGy.

In one embodiment, the film is crosslinked with an E-beam radiation, set at a voltage from 50 keV to 5 MeV. In a further embodiment, the film is crosslinked with an E-beam radiation, set at a voltage from 200 keV to 2 MeV.

In one embodiment, the film is crosslinked with y-radiation at a level of 5 kGy to 400 kGy. In a further embodiment, the film is crosslinked with y-radiation at a level of 50 kGy to 200 kGy.

In one embodiment, the film is chemically crosslinked with a crosslinking agent. In a further embodiment, the crosslinking agent is a sulfur cure agent, an azo-compound, a silane, or a peroxide. In a further embodiment, the crosslinking agent is a sulfur cure agent, a silane, or a peroxide. In a further embodiment, the crosslinking agent is a silane, or a peroxide.

In one embodiment, the film has a thickness from 50 microns to 5000 microns, preferably from 50 microns to 1000 microns, more preferably from 50 microns to 500 microns, and even more preferably from 50 microns to 200 microns.

In one embodiment, an inventive film has a crosslinking depth of 50 percent, or less, of the total film thickness, as determined by the electron beam voltage, the thickness of the film and the density of the film. The thickness of a film can be measured using a micrometer. The density of a film is defined by its polymer composition.

In a preferred embodiment, an inventive film has a total film thickness from 50 microns to 500 microns, preferably from 50 microns to 200 microns, and has a crosslinking depth of 50 percent, or less, of the total film thickness.

In one embodiment, the film has a hot set elongation value from 10 percent to 200 percent, preferably from 50 to 100 percent.

In one embodiment, the film has a hot set from 0 to 200 percent, preferably from 20 to 100 percent. In one embodiment, the film has a seal strength from 2 N/15 mm to 20 N/15 mm. In one embodiment, the film has a seal strength from 2 N/15 mm to 10 N/15 mm. In one embodiment, the film has a seal strength from 5 N/15 mm to 20 N/15 mm.

In one embodiment, the film has a seal strength greater than, or equal to, 10 N/15 mm, preferably greater than, or equal to, 20 N/15 mm.

In one embodiment, the film is formed by a blown film process.

In one embodiment, the film is formed by a cast film process.

In one embodiment, the film is formed by an extrusion process.

In one embodiment, the film is not oriented.

In one embodiment, the film consists of one layer.

In one embodiment, the film comprises at least two layers.

In one embodiment, the film comprises at least one layer formed from a nonwoven web, a woven web, a second polymer composition, paper, paper board or aluminum foil.

In one embodiment, an inventive film, and preferably a film according to the third or six aspect of the invention, consists of three layers.

In one embodiment, an inventive film, and preferably a film according to the third or six aspect of the invention, comprises at least one layer is formed from a nonwoven web, a woven web, a second polymer composition, paper, paper board, or aluminum foil.

In one embodiment, an inventive film, and preferably a film according to the third or six aspect of the invention, comprises at least four layers. In a further embodiment, at least one layer is formed from a nonwoven web, a woven web, a second polymer composition, paper, or aluminum foil.

In one embodiment, an inventive film, and preferably a film according to the third or six aspect of the invention, further comprises a layer, comprising GPPS, HIPS, ABS, SAN, nylon, styrene block copolymers, or a mixture thereof.

In one embodiment according to the third or six aspect of the invention, the moisture barrier of the film composition is determined using Hydrohead Water Pressure Test ISO 1420A1.

In one embodiment according to the third or six aspect of the invention, each of the outer layers is adjacent to a surface of the inner layer.

In one embodiment according to the third or six aspect of the invention, at least one inner layer has a Vicat softening point of at least 20° C. lower than the respective softening points of the at least two outer layers.

In one embodiment according to the third or six aspect of the invention, the exposure to the elevated temperature and the exposure to the compression force take place simultaneously.

In one embodiment according to the third or six aspect of the invention, the perforations are of sizes that are, individually, less than, or equal to, 100 microns.

In one embodiment according to the third or six aspect of the invention, the perforations are of sizes that are, individually, greater than, or equal to, 1 micron.

Component A may comprise a combination of two or more embodiments as described herein.

Component B may comprise a combination of two or more embodiments as described herein.

A film composition may comprise a combination of two or more embodiments as described herein.

An inventive film, including a perforated film, may comprise a combination of two or more embodiments as described herein.

The invention also provides an article comprising an inventive film.

In one embodiment, the article is a sheet, a carpet, an adhesive, a wire sheath, a cable, a coated fabric, an automotive part, a footwear component, a coating, a coated article, a laminated article, a foam laminate, an automotive skin, a leather article, a roofing construction article, a waterproofing membrane, an artificial leather, an artificial turf, a consumer durable, a computer component, a belt, a fiber, or a fabric.

In one embodiment, the article is a tie layer between extruded sheets, a tie layer between extruded films, a tie layer between extruded profiles, a tie layer between cast films, or tie layer between cast profiles.

The invention also provides a package comprising an inventive film.

The invention also provides a geomembrane comprising an inventive film.

The invention also provides a laminated structure comprising an inventive film. In one embodiment, the laminated structure further comprises at least one other layer in the form of a foam. In one embodiment, the laminated structure further comprises at least one other layer in the form of a fabric. In one embodiment, the laminated structure further comprises at least one other layer in the form of a nonwoven. In one embodiment, the laminated structure further comprises at least one other layer in the form of a paper or paper board. A laminated structure may comprise a combination of two or more embodiments as described herein.

The invention also provides a footwear article comprising an inventive film. In a further embodiment, the footwear article is selected from the group consisting of shoe outsole, shoe midsole, shoe unitsole, an overmolded article, a natural leather article, a synthetic leather article, an upper, a laminated article, a coated article, a boot, a sandal, galoshes, a plastic shoe, and combinations thereof.

The invention also provides a printed film comprising an inventive film, and a printed pattern. In one embodiment, the printed pattern is formed from radiation curable ink. In one embodiment, the printed pattern is formed by the vaporization and deposition of at least one metal. In a further embodiment, the metal is aluminum.

Propylene-Based Polymer

The propylene-based polymers suitable in the inventive compositions comprise propylene, and typically, ethylene and/or one or more unsaturated comonomers. Propylene-based polymers include, but are not limited to, propylene-based interpolymers. The propylene-based interpolymer can be a random or block copolymer, or a propylene-based terpolymer. Preferably, the propylene-based polymer is a propylene-based interpolynmer.

The unsaturated comonomers include, C4-C20 α-olefins, especially C4-C12 α-olefins, such as 1-butene, 1-pentene, 1-hexene, 4-methyl-1-pentene, 1-heptene, 1-octene, 1-decene, 1-dodecene and the like; C4-C20 diolefins, preferably 1,3-butadiene, 1,3-pentadiene, norbornadiene, 5-ethylidene-2-norbornene (ENB) and dicyclopentadiene; C8-40 vinyl aromatic compounds including sytrene, o-, m-, and p-methylstyrene, divinylbenzene, vinylbiphenyl, vinylnapthalene; and halogen-substituted C8-40 vinyl aromatic compounds such as chlorostyrene and fluorostyrene.

Suitable comonomers for polymerizing with propylene include ethylene, 1-butene, 1-pentene, 1-hexene, 1-heptene, 1-octene, 1-nonene, 1-decene, 1-unidecene, 1-dodecene, as well as 4-methyl-1-pentene, 4-methyl-1-hexene, 5-methyl-1-hexene, vinylcyclohexane, and styrene. The preferred comonomers include ethylene, 1-butene, 1-hexene, and 1-octene, and more preferably ethylene.

The propylene interpolymers of this invention include, but are not limited to, propylene/ethylene, propylene/ethylene/1-butene, propylene/ethylene/ENB, propylene/ethylene/1-hexene, propylene/ethylene/1-octene.

Propylene-base polymers include, but are not limited to, VERSIFY polymers (The Dow Chemical Company), VISTAMAXX polymers (ExxonMobil Chemical Co.), LICOCENE polymers (Clariant), EASTOFLEX polymers (Eastman Chemical Co.), REXTAC polymers (Hunstman), and VESTOPLAST polymers (EVONIK), TAFCELEN by Sumitomo, TAFMER XM by Mitsui, ADSYL/ADFLEX by Basell, WINTEC by JPP. Suitable propylene-based polymers include those described in U.S. Provisional Application No. 60/988999 (filed Nov. 19, 2007; now PCT/US08/082599), fully incorporated herein by reference.

The propylene-based interpolymers of this invention typically comprise units derived from propylene, in an amount of at least about 60, preferably at least about 70 and more preferably at least about 80, weight percent of the interpolymer, based on the weight of the interpolymer. The weight percent of a mononmer or comonomer can be determined by methods known in the art, including, but not limited to, FTIR and NMR (e.g., 13C NMR) methods. The typical amount of units derived from ethylene in propylene/ethylene interpolymers is at least about 0.1, preferably at least about 1, and more preferably at least about 4 weight percent, and the maximum amount of units derived from ethylene present in these interpolymers is typically not in excess of about 30, preferably not in excess of about 25, and more preferably not in excess of about 20, weight percent of the interpolymer (based on weight of the interpolymer).

In one embodiment, the propylene-based interpolymer has a melt flow rate (MFR) greater than, or equal to, 0.1, preferably greater than, or equal to 0.2, more preferably greater than, or equal to 0.5 g/10 min, and even more preferably greater than, or equal to, 2 g/10 min. In another embodiment, the propylene-based interpolymer has a melt flow rate (MFR) less than, or equal to, 100 g/10 min, preferably less than, or equal to 50, more preferably less than, or equal to 30 g/10 min, and even more preferably less than, or equal to, 12 g/10 min. The MFR is measured according to ASTM D-1238 (2.16 kg, 230° C.). In a preferred embodiment, the propylene-based interpolymer is a propylene/ethylene interpolymer.

In one embodiment, the propylene-based interpolymer has a melt flow rate (MFR) from 0.1 to 100 g/10 min, preferably from 0.5 to 50 g/10 min, and more preferably from 2 to 30 g/10 min, and even more preferably from 5 to 12 g/10 min. All individual values and subranges from 0.1 to 100 g/10 min, are included herein and disclosed herein. The MFR is measured according to ASTM D-1238 (2.16 kg, 230° C.). In a preferred embodiment, the propylene-based interpolymer is a propylene/ethylene interpolymer.

In one embodiment, the propylene-based interpolymer has a density less than, or equal to, 0.93 g/cc (cc=$cm^3$) preferably less than, or equal to, 0.92 g/cc, and more preferably less than, or equal to, 0.91 g/cc. In another embodiment, the propylene-based interpolymer has a density greater than, or equal to, 0.83 g/cc, preferably greater than, or equal to, 0.84 g/cc, and more preferably greater than, or equal to, 0.85 g/cc. In a preferred embodiment, the propylene-based interpolymer is a propylene/ethylene interpolymer.

In one embodiment, the propylene-based interpolymer has a molecular weight distribution less than, or equal to, 6, and preferably less than, or equal to, 5.5, and more preferably less than, or equal to 5. In another embodiment, the molecular weight distribution is greater than, or equal to, 2, preferably greater than, or equal to, 2.5, more preferably greater than, or equal to 3. In a preferred embodiment, the propylene-based interpolymer is a propylene/ethylene interpolymer.

In one embodiment, the weight average molecular weight ($M_w$) of the propylene-based interpolymer of this invention is from 30,000 to 1,000,000. The molecular weight distribution ($M_w/M_n$) of the propylene-based interpolymer is typically from 2 to 6. In a preferred embodiment, the propylene-based interpolymer is a propylene/ethylene interpolymer.

In one embodiment, the propylene-based interpolymer has a percent crystallinity of less than, or equal to, 50 percent, preferably less than, or equal to, 40 percent, and more preferably less than, or equal to, 35 percent, as measured by DSC. Preferably, these polymers have a percent crystallinity from 2 percent to 50 percent, including all individual values and subranges from 2 percent to 50 percent. Such individual values and subranges are disclosed herein.

In one embodiment, the propylene-based interpolymers are characterized as having at least one, preferably more than one, of the following properties: (i) 13C NMR peaks corresponding to a regio-error at about 14.6 and about 15.7 ppm, the peaks of about equal intensity, (ii) a skewness index, $S_{ix}$, greater than about −1.20, (iii) a DSC curve with a $T_{me}$ that remains essentially the same, and a $T_{Max}$ that decreases as the amount of comonomer (i.e., units derived from ethylene and/or the unsaturated comonomer(s)) in the interpolymer is increased, and (iv) an X-ray diffraction pattern that reports more gamma-form crystals than a comparable interpolymer prepared with a Ziegler-Natta catalyst. Preferably the propylene-based interpolymer is a propylene/ethylene interpolymer. It is noted that in property (i) the distance between the two 13C NMR peaks is about 1.1 ppm. These propylene-based interpolymers are made using a nonmetallocene, metal-centered, heteroaryl ligand catalyst. Typically the interpolymers of this embodiment are characterized by at least one, preferably at least two, more preferably at least three, and even more preferably all four, of these properties.

In one embodiment, the propylene-based polymer comprises at least 50 weight percent propylene (based on the total amount of polymerized monomers) and at least 5 weight percent ethylene (based on the total amount of polymerized monomer), and has 13C NMR peaks, corresponding to a region error, at about 14.6 and 15.7 ppm, and the peaks are of about equal intensity (for example, see U.S. Pat. No. 6,919,407, column 12, line 64 to column 15, line 51, incorporated herein by reference).

With respect to the X-ray property of subparagraph (iv) above, a "comparable" interpolymer is one having the same monomer composition within 10 weight percent, and the same $M_w$ (weight average molecular weight) within 10 weight percent. For example, if an inventive propylene/ethylene/1-hexene interpolymer is 9 weight percent ethylene and 1 weight percent 1-hexene, and has a $M_w$ of 250,000, then a comparable polymer would have from 8.1 to 9.9 weight percent ethylene, from 0.9 to 1.1 weight percent 1-hexene, and a $M_w$ from 225,000 to 275,000, and prepared with a Ziegler-Natta catalyst.

As discussed above, in one embodiment, the propylene-based interpolymers are made using a metal-centered, heteroaryl ligand catalyst, in combination with one or more activators, for example, an alumoxane. In certain embodiments, the metal is one or more of hafnium and/or zirconium. More specifically, in certain embodiments of the catalyst, the use of a hafnium metal has been found to be preferred, as compared to a zirconium metal, for heteroaryl ligand catalysts. The catalysts, in certain embodiments, are compositions comprising the ligand and metal precursor, and, optionally, may additionally include an activator, combination of activators, or activator package. Suitable catalyst structures and associated ligands are described in U.S. Pat. No. 6,919,407, column 16, line 6 to column 41, line 23, which is incorporated herein by reference. Suitable polymerization conditions are described in U.S. Pat. No. 6,919,407, column 41, line 23 to column 45, line 43, incorporated herein by reference.

A propylene-based interpolymer may have a combination of two or more suitable embodiments as described herein.

A propylene/α-olefin interpolymer may have a combination of two or more suitable embodiments as described herein.

A propylene/ethylene interpolymer may have a combination of two or more suitable embodiments as described herein.

Ethylene-Base Polymers

Ethylene-base polymers include, but are not limited to, high density polyethylene (HDPE), linear low density polyethylene (LLDPE), ultra low density polyethylene (ULDPE), homogeneously branched linear ethylene polymers, and homogeneously branched substantially linear ethylene polymers (that is homogeneously branched long chain branched ethylene polymers).

High density polyethylene (HDPE), useful as a polyolefin resin, typically has a density of about 0.95 to about 0.97 g/cc. Commercial examples of HDPE are readily available in the market. Other suitable ethylene polymers include low density polyethylene (LDPE), linear low density polyethylene (LLDPE), and linear ultra low density polyethylene (ULDPE). Typically the low density polyethylene (LDPE) is made under high-pressure, using free-radical polymerization conditions. Low density polyethylene typically has a density from 0.91 to 0.94 g/cc.

Linear low density polyethylene (LLDPE) is characterized by little, if any, long chain branching, in contrast to conventional LDPE. The processes for producing LLDPE are well known in the art, and commercial grades of this polyolefin resin are available. Generally, LLDPE is produced in gas-phase fluidized bed reactors or liquid phase solution process reactors, using a Ziegler-Natta catalyst system.

The linear low density polyethylene (LLDPE), ultra low density polyethylene (ULDPE), homogeneously branched linear ethylene interpolymers, and homogeneously branched substantially linear ethylene interpolymer, each typically have polymerized therein at least one α-olefin. The term "interpolymer," used herein, indicates the polymer can be a copolymer, a terpolymer, or any polymer having more than one polymerized monomer. Monomers usefully copolymerized with ethylene to make the interpolymer include the C3-C20 α-olefins, more preferably C3-C10 α-olefins, and especially propylene, 1-butene, 1-pentene, 1-hexene, 4-methyl-1-pentene, 1-heptene and 1-octene. Especially preferred comonomers include propylene, 1-butene, 1-hexene and 1-octene.

Commercial examples of suitable ethylene-base interpolymers include ENGAGE, ATTANE, AFFINITY, DOWLEX, ELITE, all available from The Dow Chemical Company; EXCEED and EXACT available from Exxon Chemical Company; and TAFMER polymers available from the Mitsui Chemical Company.

The terms "homogeneous" and "homogeneously-branched" are used in reference to an ethylene/α-olefin interpolymer, in which the α-olefin comonomer is randomly distributed within a given polymer molecule, and all of the polymer molecules have the same or substantially the same comonomer(s)-to-ethylene ratio. Included amongst the homogeneously branched linear ethylene interpolymers are ethylene polymers, which lack long chain branching (or measurable amounts of long chain branching), but do have short chain branches, derived from the comonomer polymerized into the interpolymer, and which are homogeneously distributed, both within the same polymer chain, and between different polymer chains. That is, homogeneously branched linear ethylene interpolymers lack long chain branching, just as is the case for the linear low density polyethylene polymers or linear high density polyethylene polymers, made using uniform branching distribution polymerization processes. Commercial examples of homogeneously branched linear ethylene/α-olefin interpolymers include TAFMER polymers supplied by the Mitsui Chemical Company, and EXACT polymers supplied by ExxonMobil Chemical Company.

As discussed above, homogeneously branched linear ethylene interpolymers have a linear polymer backbone, no measurable long chain branching, and a narrow molecular weight distribution. Such polymers are typically interpolymers of ethylene and at least one α-olefin comonomer of from 3 to 20 carbon atoms, and are preferably copolymers of ethylene with a C3-C10 α-olefin, and are more preferably copolymers of ethylene with propylene, 1-butene, 1-pentene, 1-hexene, 1-heptene or 1-octene, and even more preferably, propylene, 1-butene, 1-hexene or 1-octene. This class of polymers is disclosed for example, by Elston in U.S. Pat. No. 3,645,992, and subsequent processes to produce such polymers, using metallocene catalysts, have been developed, as shown, for example, in EP 0 129 368; EP 0 260 999; U.S. Pat. Nos. 4,701,432; 4,937,301; 4,935,397; 5,055,438; and WO 90/07526; each incorporated herein by reference. The polymers can be made by conventional polymerization processes (for example, gas phase, slurry, solution, and high pressure).

The homogeneously branched substantially linear ethylene interpolymers are described in U.S. Pat. Nos. 5,272,236; 5,278,272; 6,054,544; 6,335,410 and 6,723,810; each fully incorporated herein by reference. The substantially linear ethylene interpolymers are those in which the comonomer is randomly distributed within a given interpolymer molecule, and all of the interpolymer molecules have the same or substantially the same comonomer/ethylene ratio within that interpolymer. In addition, the substantially linear ethylene interpolymers are homogeneously branched ethylene interpolymers having long chain branching. The long chain branches have the same comonomer distribution as the polymer backbone, and can have about the same length as the length of the polymer backbone. "Substantially linear," typically, is in reference to a polymer that is substituted, on average, with 0.01 long chain branches per 1000 total carbons to 3 long chain branches per 1000 total carbons. The length of a long chain branch is longer than the carbon length of a short chain branch formed from the incorporation of one comonomer into the polymer backbone. Commercial examples of substantially linear polymers include the ENGAGE polymers and AFFINITY polymers (both available from The Dow Chemical Company).

In contrast to "substantially linear ethylene polymer," "linear ethylene polymer" means that the polymer lacks measurable or demonstrable long chain branches, that is, the polymer is substituted with an average of less than 0.01 long chain branch per 1000 carbons.

The substantially linear ethylene interpolymers form a unique class of homogeneously branched ethylene polymers. They differ substantially from the well-known class of conventional, homogeneously branched linear ethylene interpolymers, described by Elston in U.S. Pat. No. 3,645,992, and, moreover, they are not in the same class as conventional heterogeneous "Ziegler-Natta catalyst polymerized" linear ethylene polymers (for example, ultra low density polyethylene (ULDPE), linear low density polyethylene (LLDPE) or high density polyethylene (HDPE) made, for example, using the technique disclosed by Anderson et al. in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

"Long chain branching (LCB)" can be determined by conventional techniques known in the industry, such as 13C nuclear magnetic resonance (13C NMR) spectroscopy, using, for example, the method of Randall (Rev. Micromole. Chem. Phys., C29 (2&3), 1989, pp. 285-297). Two other methods are gel permeation chromatography, coupled with a low angle laser light scattering detector (GPC-LALLS), and gel permeation chromatography, coupled with a differential viscometer detector (GPC-DV). The use of these techniques for long chain branch detection, and the underlying theories, have been well documented in the literature. See, for example, Zimm, B. H. and Stockmayer, W. H., J. Chem. Phys., 17,1301 (1949) and Rudin, A., Modern Methods of Polymer Characterization, John Wiley & Sons, New York (1991) pp. 103-112.

The homogeneous branched ethylene polymers useful in the present invention will preferably have a single melting peak, as measured using differential scanning calorimetry (DSC), in contrast to heterogeneously branched linear ethylene polymers, which have two or more melting peaks, due to the heterogeneously branched polymer's broad branching distribution.

In a preferred embodiment of the invention, the ethylene-based polymer is an ethylene/α-olefin interpolymer, comprising at least one α-olefin.

Comonomers include, but are not limited to, propylene, isobutylene, 1-butene, 1-pentene, 1-hexene, 3-methyl-1-pentene, 4-methyl-1-pentene, and 1-octene, non-conjugated dienes, polyenes, butadienes, isoprenes, pentadienes, hexadienes (for example, 1,4-hexadiene), octadienes, styrene, halo-substituted styrene, alkyl-substituted styrene, tetrafluoroethylenes, vinylbenzocyclobutene, naphthenics, cycloalkenes (for example, cyclopentene, cyclohexene, cyclooctene), and mixtures thereof. Typically the ethylene is copolymerized with one C3-C20 α-olefin, and preferably one C3-C10 α-olefin. Preferred comonomers include propene, 1-butene, 1-pentene, 1-hexene, 1-heptene and 1-octene, and more preferably include propene, 1-butene, 1-hexene and 1-octene.

Illustrative copolymers, containing only polymerized ethylene and one α-olefin, include ethylene/propylene (EP) copolymers, ethylene/butene (EB) copolymers, ethylene/hexene (EH) copolymers, ethylene/octene (EO) copolymers, and ethylene/propylene/octene terpolymers. Preferred copolymers include EP, EB, EH and EO copolymers.

In one embodiment, the ethylene/α-olefin interpolymer has a molecular weight distribution ($M_w/M_n$) less than, or equal to, 10, and preferably less than, or equal to, 5.

In one embodiment, the ethylene/α-olefin interpolymers have a molecular weight distribution from 1.1 to 5, and more preferably from about 1.5 to 4, or 1.5 to 3. All individual values and subranges from about 1 to 5 are included herein and disclosed herein.

In one embodiment, the ethylene-based polymers, and preferably ethylene/α-olefin interpolymers, have a melt index, I2, less than, or equal to, 40 g/10 min, preferably less than, or equal to, 20 g/10 min, more preferably less than, or equal to, 10 g/10 min, or less than, or equal to, 5 g/10 min, as measured in accordance with ASTM 1238, Condition 190° C./2.16 kg.

In one embodiment, the ethylene-based polymers, and preferably ethylene/α-olefin interpolymers, have a melt index, I2, greater than, or equal to, 0.1 g/10 min, preferably greater than, or equal to, 0.2 g/10 min, more preferably greater than, or equal to, 0.5 g/10 min, as measured in accordance with ASTM 1238, Condition 190° C./2.16 kg.

In one embodiment, the ethylene/α-olefin interpolymer has a melt index (I2) from 0.1 g/10 min to 40 g/10 min, or from 0.5 g/10 min to 10 g/10 min, or from 0.5 g/10 min to 5 g/10 min, as determined using ASTM D-1238 (190° C., 2.16 kg load). All individual values and subranges from 0.1 g/10 min to 40 g/10 min are includes herein and disclosed herein.

In one embodiment, the ethylene/α-olefin interpolymer has a density less than, or equal to, 0.965 g/cc (cc=cm$^3$), preferably less than, or equal to, 0.955 g/cc, and more preferably less than, or equal to, 0.950 g/cc. In another embodiment, the ethylene/α-olefin interpolymer has a density greater than, or equal to, 0.850 g/cc, preferably greater than, or equal to, 0.900 g/cc, and more preferably greater than, or equal to, 0.910 g/cc.

In one embodiment, the ethylene/α-olefin interpolymer has a density less than, or equal to, 0.930 g/cc, preferably less than, or equal to, 0.920 g/cc, and more preferably less than, or equal to, 0.910 g/cc. In another embodiment, the ethylene/α-olefin interpolymer has a density greater than, or equal to, 0.860 g/cc, preferably greater than, or equal to, 0.865 g/cc, and more preferably greater than, or equal to, 0.870 g/cc.

In one embodiment, the ethylene/α-olefin interpolymer has a PRR (as described below) less than, or equal to, 4, preferably less than, or equal to, 3, and more preferably less than, or equal to, 2.

In one embodiment, the ethylene/α-olefin interpolymer has a PRR greater than, or equal to, 8, and preferably greater than, or equal to, 12.

Interpolymer viscosity is conveniently measured in poise (dyne-second/square centimeter (d-sec/cm$^2$)) at shear rates within a range of 0.1-100 radian per second (rad/sec), and at 190° C., under a nitrogen atmosphere, using a dynamic mechanical spectrometer (such as a RMS-800 or ARES from Rheometrics), under a dynamic sweep made from 0.1 to 100 rad/sec. The viscosities at 0.1 rad/sec and 100 rad/sec may be represented, respectively, as $V_{0.1}$ and $V_{100}$, with a ratio of the two referred to as RR and expressed as $V_{0.1}/V_{100}$. The PRR value is calculated by the formula:

$$PRR=RR+[3.82-\text{interpolymer Mooney Viscosity} \\ (ML_{1+4} \text{ at } 125°\text{ C.})] \times 0.3.$$

PRR determination is described in U.S. Pat. No. 6,680,361, fully incorporated herein by reference.

An ethylene-based polymer may have a combination of two or more suitable embodiments as described herein.

An ethylene/α-olefin interpolymer may have a combination of two or more suitable embodiments as described herein.

Ethylene/α-Olefin/Diene Interpolymer and Ethylene/Propylene Rubber

The ethylene/α-olefin/diene interpolymers have polymerized therein ethylene, at least one α-olefin (for example, a C3-C20 α-olefin monomer), and a diene (for example, a C4-C40 diene monomer). The α-olefin may be either an aliphatic or an aromatic compound, and may contain vinylic unsaturation or a cyclic compound, such as styrene, p-methyl styrene, cyclobutene, cyclopentene, and norbornene, including norbornene substituted in the 5 and 6 position with C1-C20 hydrocarbyl groups. The α-olefin is preferably a C3-C20 aliphatic compound, preferably a C3-C16 aliphatic compound, and more preferably a C3-C10 aliphatic compound. Preferred ethylenically unsaturated monomers include 4-vinylcyclohexene, vinylcyclohexane, and C3-C10 aliphatic α-olefins (especially preferably propylene, isobutylene, 1-butene, 1-pentene, 1-hexene, 3-methyl-1-pentene, 4-methyl-1-pentene, 1-octene, 1-decene and 1-dodecene). A more preferred C3-C10 aliphatic α-olefin is selected from the group consisting of propylene, 1-butene, 1-hexene and 1-octene, and more preferably propylene. In a preferred embodiment, the ethylene/α-olefin interpolymer is an EPDM interpolymer. In a further embodiment, the diene is 5-ethylidene-2-norbornene (ENB).

In one embodiment, the ethylene/α-olefin/diene interpolymer of the present invention has a C2 content of from 51 to 95 weight percent, and most preferably from 55 to 90 weight percent, or from 60 to 90 weight percent, based on the total weight of the interpolymer. The interpolymers also contain at least one α-olefin, and preferably propylene, typically at a level of from 5 to 49 weight percent, and most preferably from 10 to 45 weight percent, or 10 to 40 weight percent, based on the total weight of the interpolymer.

In one embodiment, the interpolymer contains a non-conjugated diene, and the non-conjugated diene content is preferably from 0.5 to 25 weight percent, more preferably from 1 to 20 weight percent, and most preferably from 2 to 10 weight percent, based on total weight of the interpolymer. In another embodiment, more than one diene may be incorporated simultaneously, for example 1,4-hexadiene and ENB, with total diene incorporation within the limits specified above.

In one embodiment, the diene monomer is a non-conjugated diolefin that is conventionally used as a cure site for cross-linking. The nonconjugated diolefin can be a C6-C15 straight chain, branched chain or cyclic hydrocarbon diene. Illustrative nonconjugated dienes are straight chain acyclic dienes, such as 1,4-hexadiene and 1,5-heptadiene; branched chain acyclic dienes such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene and 5-cyclohexylidene-2-norbornene. The diene is preferably a nonconjugated diene selected from the group consisting of ENB, dicyclopentadiene, 1,4-hexadiene, 7-methyl-1,6-octadiene, and preferably, ENB, dicyclopentadiene and 1,4-hexadiene, more preferably ENB and dicyclopentadiene, and even more preferably ENB.

In one embodiment, the diene is a conjugated diene selected from the group consisting of 1,3-pentadiene, 1,3-butadiene, 2-methyl-1,3-butadiene, 4-methyl-1,3-pentadiene, or 1,3-cyclopentadiene. The diene monomer content, whether it comprises a conjugated diene, a non-conjugated diene, or both, may fall within the limits specified above for non-conjugated dienes.

Although preferred ethylene/α-olefin interpolymers are substantially free of any diene monomer that typically induces LCB, one may include such a monomer if costs are acceptable, and desirable interpolymer properties, such as, for example, processibility, tensile strength or elongation, do not degrade to an unacceptable level. Such diene monomers include dicyclopentadiene, NBD, methyl norbornadiene, vinyl-norbornene, 1,6-heptadiene, 1,7-octadiene, and 1,9-decadiene. When added, such monomers are added in an amount within a range of from "greater than zero" to 3 weight percent, more preferably from 0.01 to 2 weight percent, based on total weight of polymerized monomers.

Preferred interpolymers of the present invention have polymerized therein ethylene, at least one α-olefin, and 5-ethylidene-2-norbornene (ENB). Preferred α-olefins include propylene, 1-butene, 1-hexene and 1-octene, and most preferably propylene. In a preferred embodiment, the interpolymer has polymerized therein ethylene, propylene and 5-ethylidene-2-norbornene (ENB).

In one embodiment, the amount of ENB in the interpolymer is from 0.5 to 15 weight percent, preferably from 1 to 10 weight percent, and more preferably from 2 to 8 weight percent, based on the total weight of the interpolymer.

In general, polymerization may be accomplished at conditions well known in the art for Ziegler-Natta or Kaminsky-Sinn type polymerization reactions, that is, temperatures from 0° C. to 250° C., preferably 30° C. to 200° C., and pressures from atmospheric to 10,000 atmospheres. Polymerizations may also be conducted in accordance with processes disclosed in European Patent Application EP0775718A. This application and its cited references are fully incorporated herein by reference. Polymerizations may be performed using a slurry, or gas phase polymerization, or combinations thereof.

Polymerization is preferably by a single site catalyst (metallocene or constrained geometry catalyst), producing a low odor, relatively gel-free product. Suitable catalysts for use herein, preferably include constrained geometry catalysts, as disclosed in U.S. Pat. Nos. 5,272,236 and 5,278,272, which are both fully incorporated herein by reference. The monocyclopentadienyl transition metal olefin polymerization catalysts taught in U.S. Pat. No. 5,026,798, the teachings of which are incorporated herein by reference, are also suitable as catalysts of the invention.

Preferred examples of suitable interpolymers for use in the invention include NORDEL IP polymers available from The Dow Chemical Company.

In one embodiment of the invention, the ethylene/α-olefin/diene interpolymer has a molecular weight distribution (Mw/Mn) from 1.1 to 5, more preferably from 1.2 to 4 and most preferably from 1.5 to 3. All individual values and subranges from 1.1 to 5 are included herein and disclosed herein. In a preferred embodiment, the ethylene/α-olefin interpolymer is an ethylene/propylene/diene (EPDM) interpolymer.

In one embodiment, the ethylene/α-olefin/diene interpolymer has a density greater than, or equal to, 0.820 g/cc, preferably greater than, or equal to, 0.830 g/cc, and more preferably greater than, or equal to, 0.840 g/cc. In a preferred embodiment, the ethylene/α-olefin interpolymer is an ethylene/propylene/diene (EPDM) interpolymer.

In another embodiment, the ethylene/α-olefin/diene interpolymer has a density less than, or equal to, 0.960 g/cc, preferably less than, or equal to, 0.930 g/cc, and more preferably less than, or equal to, 0.910 g/cc. In a preferred embodiment, the ethylene/α-olefin/diene interpolymer is an EPDM interpolymer.

In one embodiment, the ethylene/α-olefin/diene interpolymer has a polymer Mooney Viscosity, ML(1+4) at 125° C., greater than 60, or greater than 70, or greater than 80, or greater than 90, or greater than 100. Polymer Mooney Viscosity refers to the viscosity of the "neat" polymer absent partitioning agent and oil. In a preferred embodiment, the interpolymer is an EPDM interpolymer.

In one embodiment, the ethylene/α-olefin interpolymer has a polymer Mooney Viscosity, ML(1+4) at 125° C., from 60 to 200, or from 80 to 180, or from 100 to 160. In a preferred embodiment, the interpolymer is an EPDM interpolymer.

In one embodiment, the ethylene/α-olefin/diene interpolymer has a polymer Mooney Viscosity, ML(1+4) at 125° C., less than, or equal to, 150, or less than, or equal to, 140, or less than, or equal to, 130, or less than, or equal to, 120, or less than, or equal to, 100. In a preferred embodiment, the interpolymer is an EPDM interpolymer.

The crosslinking enhancement component may also be an ethylene/propylene rubber (EPR). In one embodiment, the EPR has a density from 0.810 to 0.960 g/cc, preferably from 0.820 to 0.950 g/cc, and preferably from 0.840 to 0.930 g/cc, and more preferably from 0.860 to 0.910 g/cc (ASTM D-792-00). In another embodiment, the EPR has a density greater than, or equal to, 0.820 g/cc, preferably greater than, or equal to, 0.83 g/cc, and more preferably greater than, or equal to, 0.840 g/cc. In another embodiment, the EPR has a density less than, or equal to, 0.960 g/cc, preferably less than, or equal to, 0.930 g/cc, and more preferably less than, or equal to, 0.910 g/cc.

An ethylene/α-olefin/diene interpolymer may have a combination of two or more embodiments as described herein.

An ethylene/propylene rubber may have a combination of two or more embodiments as described herein.

Olefin-Based Polymer

The olefin-based polymer may be selected from C4-C10 olefin-based polymers, and preferably C6-C8 olefin-based polymers, including homopolymers and interpolymers. Examples of isotactic and syndiotactic monoolefin polymers are commercially available.

Additives

A film composition may contain one or more additives. Additives include, but are not limited to, antioxidants; surface tension modifiers; anti-block agents; plasticizers; processing oils, crosslinking agents, dispersants, blowing agents, UV stabilizers, antimicrobial agents such as organometallics, isothiazolones, organosulfurs and mercaptans; antioxidants such as phenolics, secondary amines, phosphites and thioesters; antistatic agents such as quaternary ammonium compounds, amines, and ethoxylated, propoxylated or glycerol compounds; fillers and reinforcing agents such as carbon black, glass, metal carbonates such as calcium carbonate, metal sulfates such as calcium sulfate, talc, clay, magnesium hydroxide, aluminum trihydrate or other flame retardants, or glass or graphite fibers; hydrolytic stabilizers; lubricants such as fatty acids, fatty alcohols, esters, fatty amides, metallic stearates, paraffinic and microcrystalline waxes, silicones and orthophosphoric acid esters; acid neutralizers or halogen scavengers such as zinc oxide; mold release agents such as fine-particle or powdered solids, soaps, waxes, silicones, polyglycols and complex esters such as trimethylol propane tristearate or pentaerythritol tetrastearate; pigments, dyes and colorants; heat stabilizers such as organotin mercaptides, an octyl ester of thioglycolic acid and a barium or cadmium carboxylate; ultraviolet light stabilizers such as a hindered amine, an o-hydroxy-phenylbenzotriazole, a 2-hydroxy-4-alkoxybenzophenone, a salicylate, a cyanoacrylate, a nickel chelate and a benzylidene malonate and oxalanilide; acidscavengers; and zeolites, molecular sieves and other known deodorizers.

Other additives include scratch/mar additives, such as polydimethyl siloxane (PDMS), or functionalized polydimethyl siloxane, or IRGASURF® SR 100 (available from Ciba Specialty Chemicals), or scratch mar formulations containing erucamide. Functionalized polydimethyl siloxanes include, but are not limited to, hydroxyl functionalized polydimethyl siloxane, amine functionalized polydimethyl siloxane, vinyl functionalized polydimethyl siloxane, aryl functionalized polydimethyl siloxane, alkyl functionalized polydimethyl siloxane, carboxyl functionalized polydimethyl siloxane, mercaptan functionalized polydimethyl siloxane, and derivatives of the same. One skilled in the art can readily determine quantities of additives needed based on the application involved.

In a preferred embodiment, a film composition does not contain a polar polymer, such as a polyamide, a polyester, an ethylene vinyl alcohol, a polyurethane, or a polylactic acid.

In a preferred embodiment, a film does not contain an acrylate, such as ethylene methylacrylate copolymer, ethylene ethylacrylate copolymer, or ethylene butylacrylate copolymer.

In a preferred embodiment, a film does not contain ethylene vinyl acetate copolymer, ethylene acrylic acid copolymer or ethylene methacrylic copolymer.

In a preferred embodiment, a film does not contain an ionomer, such as one or more SURLYN ionomers available from DuPont.

In a preferred embodiment, a film does not contain a polyvinylchloride (PVC) or a vinylidene chloride copolymer (PVDC).

In a preferred embodiment, a film does not contain a grafted ethylene-based polymer, for example, a maleic anhydride grafted ethylene-based polymer, and does not contain a grafted propylene-based polymer, for example, a maleic anhydride grafted propylene-based polymer.

In a preferred embodiment, a film does not contain an olefin/vinyl aromatic copolymer.

A film may have a combination of two or more embodiments as described herein.

Process for Forming the Films or Laminates of the Invention

The invention provides for single layered and multilayered films, which can be formed by blown extrusion, extrusion coating, or extrusion lamination (such as in-between web based materials), and other processes. A multilayer film may comprise polymeric films, polymeric non-wovens, woven fabrics or pulp and paper based products, or metallic foils including metallized polymeric films (laminates).

A film of the invention may be prepared by selecting the thermoplastic polymers or blends suitable for making each layer; forming a film of each layer, and where the film contains more than one layer, bonding the layers, blow molding, coextruding, or casting one or more layers. Desirably, the film layers are bonded continuously over the interfacial area between films (film layers).

Laminates, manufactured either by means of heat lamination, extrusion coating and/or extrusion lamination, combine molten polymer (melt coating) or molten polymer film (heat lamination) surface under pressure, with a range of web based materials including polymeric films, non-wovens, fabrics, paper and board, metal foils or metallized polymeric films. In general, the invention is not limited to film, but is also useful for example, for blow molded containers, injection molded parts, fabric coated membranes, and the like.

For each layer, typically, it is suitable to extrusion blend the components and any additional additives, such as slip, antiblock, and polymer processing aids. The extrusion blending should be carried out in a manner, such that an adequate degree of dispersion is achieved. The parameters of extrusion blending will necessarily vary depending upon the components. However, typically the total polymer deformation, that is, mixing degree, is important, and is controlled by, for example, the screw-design and the melt temperature. The melt temperature during film forming will depend on the film components.

After extrusion blending, a film structure is formed. Film structures may be made by conventional fabrication techniques, for example, bubble extrusion, biaxial orientation processes (such as tenter frames or double bubble processes), cast/sheet extrusion, direct membrane extrusion, coextrusion and lamination. Conventional bubble extrusion processes (also known as hot blown film processes) are described, for example, in *The Encyclopedia of Chemical Technology*, Kirk-Othmer, Third Edition, John Wiley & Sons, New York, 1981, Vol. 16, pp. 416-417 and Vol. 18, pp. 191-192. Biaxial orientation film manufacturing processes, such as described in the "double bubble" process of U.S. Pat. No. 3,456,044 (Pahlke), and the processes described in U.S. Pat. No. 4,352,849 (Mueller), U.S. Pat. Nos. 4,820,557 and 4,837,084 (both to Warren), U.S. Pat. No. 4,865,902 (Golike et al.), U.S. Pat. No. 4,927,708 (Henan et al.), U.S. Pat. No. 4.952,451 (Mueller), and U.S. Pat. Nos. 4,963,419 and 5,059,481 (both to Lustig et al.), can also be used to make the novel film structures of this invention. All of these patents are incorporated herein by reference.

The melt temperature during the film forming will vary depending on the components of the film. Generally, the melt temperature is from 175° C. to 300° C., preferably from 185° C. to 240° C., and more preferably from 195° C. to 220° C.

Sheets of the film can be bonded by heat sealing or by use of an adhesive, and preferably by heat sealing. Heat sealing can be effected using conventional techniques, including, but not limited to, a hot bar, impulse heating, side welding, ultrasonic welding, or other alternative heating mechanisms.

The films of the aforementioned processes may be made to any thickness depending upon the application. In one embodiment, the films have a total thickness of from 25 to 5000, microns, preferably from 25 to 1500 microns, more preferably from 25 to 500 microns.

In a preferred embodiment, an inventive film has a gel content greater than 30 weight percent, preferably greater than 40 weight percent, and more preferably greater than 50 weight percent, based on the weight of the film. Gel content can be determined by soaking the film in refluxing xylene for 12 hours, as described in ASTM D 2765-90, method B. The insoluble polymer is isolated, dried and weighed. The insoluble polymer is reported as the percent gel content. Corrections are made for the known weight of any non-polymeric component(s).

Applications

The invention provides an article comprising at least one component formed from an inventive film. The inventive compositions are suitable for laminates, extruded sheets, adhesives, and tie layers between extruded sheets, tie layers between cast sheets, tie layers between films and tie layers between profiles. Additional articles include a carpet component; an adhesive; a fabric; a dispersion; a wire sheath; a cable; a protective apparel; a coating; a coated article; artificial leather; artificial turf; fibers; and liners (for example, roofing liners, geomemembranes and tunnel liners).

The invention also provides for various films (for example, blown film, cast film, extruded film) comprising at least one component formed from an inventive film.

The invention provides a package comprising at least one component formed from an inventive film.

The invention also provides a geomembrane comprising at least one component formed from an inventive film.

The invention provides a laminated structure comprising at least one component formed from an inventive film. In one embodiment, one of the layers is in the form of a foam. In another embodiment, one of the layers is in the form of a fabric, a nonwoven, or paper.

The invention also provides perforated layered films, which, upon exposure to elevated temperature and a compression force, form a barrier to moisture, for example, in terms of the transport of water, in predominantly liquid form, through the perforations of the film. The films may be used for various packaging, and in particular, for flexible packaging. The packages formed from the films can be filled effectively, under pressurized conditions, with powdery materials.

The configuration of the perforations within a film will vary, and will depend on the final use of the film. Sheets of the film may have perforation in designated areas within the sheet. Designated areas may be of any size and shape. Within these designated areas, the perforation may exist in various configurations, including, but not limited to, perforation size gradients along a particular axis of an area, perforation density gradients along a particular axis of an area, and perforation gradients of different shapes and/or sizes.

Definitions

The term "composition," as used herein, includes a mixture of materials which comprise the composition, as well as reaction products and decomposition products formed from the materials of the composition.

The terms "blend" or "polymer blend," as used herein, mean a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "polymer," as used herein, refers to a polymeric compound prepared by polymerizing monomers, whether of the same or a different type. The generic term polymer thus embraces the term homopolymer, employed to refer to polymers prepared from only one type of monomer, and the term interpolymer as defined hereinafter. The terms "ethylene/α-olefin polymer" and "propylene/α-olefin polymer" are indicative of interpolymers as described below.

The term "interpolymer," as used herein, refers to polymers prepared by the polymerization of at least two different types of monomers. The generic term interpolymer thus includes copolymers, employed to refer to polymers prepared from two different monomers, and polymers prepared from more than two different types of monomers.

The term, "olefin-based polymer," as used herein, refers to a polymer that comprises, in polymerized form, a majority weight amount of an olefin monomer, for example ethylene or propylene (based on the weight of polymer), and optionally may comprise one or more comonomers.

The term, "C4-C10 olefin-based polymer," as used herein, refers to a polymer that comprises, in polymerized form, a majority weight amount of an C4-C10 olefin monomer, for example 1-butene or 1-octene (based on the weight of polymer), and optionally may comprise one or more comonomers.

The term, "ethylene-based polymer," as used herein, refers to a polymer that comprises, in polymerized form, a majority weight amount of ethylene (based on the total weight of polymer), and optionally may comprise one or more comonomers.

The term, "ethylene/α-olefin interpolymer," as used herein, refers to an interpolymer that comprises, in polymerized form, a majority weight amount of ethylene (based on the total weight of interpolymer), and at least one α-olefin.

The term, "ethylene/α-olefin/diene interpolymer," as used herein, refers to an interpolymer that comprises, in polymerized form, a majority weight amount of ethylene (based on the total weight of interpolymer), at least one α-olefin, and at least one diene monomer.

The term, "propylene-based polymer," as used herein, refers to a polymer that comprises, in polymerized form, a majority weight amount of propylene (based on the total weight of polymer), and optionally may comprise one or more comonomers.

The term, "propylene/α-olefin interpolymer," as used herein, refers to an interpolymer that comprises, in polymerized form, a majority weight amount of propylene (based on the total weight of interpolymer), and at least one α-olefin.

The term, "propylene/ethylene interpolymer," as used herein, refers to an interpolymer that comprises, in polymerized form, a majority weight amount of propylene monomer (based on the total weight of interpolymer), ethylene, and, optionally, one or more additional comonomers.

The terms "comprising", "including", "having" and their derivatives are not intended to exclude the presence of any additional component, step or procedure, whether or not the same is specifically disclosed. In contrast, the term, "consisting essentially of" excludes from the scope of any succeeding recitation any other component, step or procedure, excepting those that are not essential to operability. The term "consisting" of excludes any component, step or procedure not specifically delineated or listed.

Test Methods

Density is determined in accordance with American Society for Testing and Materials (ASTM) procedure ASTM D792-00.

The melt index ($I_2$) of ethylene-based polymers is measured in accordance with ASTM D-1238-04, condition 190° C./2.16 kg. ASTM D-1238-04 can also be used to measure melt index of other polymers as noted in this test procedure. The melt flow rate (MFR) of propylene-based polymers is measured in accordance with ASTM D-1238-04, condition 230° C./2.16 kg.

Interpolymer Mooney Viscosity, MV, (ML 1+4 at 125° C.) is measured in accordance with ASTM D1646-04.

Hot Set for Films, Sheeting and Laminates

Hot set measures the thermal resistance and the degree of crosslinking. The sample is heated above the polymer(s) crystalline melting point(s), under a weight load. Crosslinked samples will hold the load and only extend to a certain percentage (the hot set value [%]). The lower the hot set, the higher the crosslink level.

The hot set test method applied for films tested has been derived from BS EN 60811-2-1:1998. The hot set test method applied, complies by enlarging the BS designed for structural applications, for examples, cables; however the method was adjusted to enable testing of low thickness web-based materials including films, laminates or membranes. The following test conditions were applied.

Sample cross sections, as defined by the measured film thickness (in microns) times the sample width (in mm), are exposed to a weight load equivalent to 0.2 N/mm$^2$, in accordance to method described under BS EN 60811-2-1:1998.

The standard test temperature for polyolefins used in the industry is 200° C. This is well above the crystalline melting temperature of polyolefins, and thus is representative to describe the existence of a three dimensional cross-linked network. In accordance with the specific formulation requirements and intended use, the test temperature may be lowered or increased, as well as the testing time and test load, beyond the conditions described in above standard.

Sample dimensions for the tested films/laminates were chosen to be "20-25 mm wide" and "140 mm long." The hot set was determined by measuring the elongation between two test marks, each at a distance of 15 mm from the center of the test strip (total distance=30 mm), loaded with the specified stress.

Exposure time to temperature and mechanical stress is set to ten minutes according to the standard. Depending on the sample thickness, this time can be adjusted. Stable test conditions are secured as soon as the test specimens have reached the desired test temperature. Earliest testing of the samples was one full day after production and/or crosslinking treatment.

Heat Seal/Peel Seal Strength

Heat seal strength and peel seal strength form part of the heat sealing test described, with the following test conditions applied on a lab heat sealer, for example, a KOPP Heat Sealer.

Test Equipment Description:

Two heat seal bars: one bar stationary, and one bar movable with pressure control. Heat seal bars are typically TELFON coated, and are heated electrically.

Sample Preparation

Two web samples were positioned on top of each other in such a way, that the surfaces to be sealed were facing each other. The pair of web samples to be heat sealed was sandwiched between "23 micron thickness" PET films, in order to prevent sticking to the heated seal bars.

Samples of following dimension are collected at each test condition.

Width=15 mm
Length=50 mm
Number of samples=5
Sealing Cycle:
Seal bar width=5 mm
Sealing bar pressure=0.5 N/mm$^2$
Sealing time=0.5 sec
Sealing bar temperature=variable ° C.

Assessment of heat seal/peel seal strength was measured by separating heat sealed samples on a tensile testing equipment, which records the following parameters.

Cross head speed=127 mm/sec
Seal/Peel Force (N)
Calculate average measurements
Classification of seal/peel fracture—see Table 1

TABLE 1

| Type of seal/peel fracture (delamination behavior) | Classification |
|---|---|
| Delamination | No seal strength/No peel strength refers to a strength of less than 0.3N |
| Delamination of seal | peel strength |
| Break at seal * | seal strength |

* seal strength higher than film strength

Heat Weld Test

Welding of polymers describes the process of combining (bonding) material surfaces under pressure and temperature, usually requiring fully or partial melting of components to combine. Welding of polymers requires compatibility of material pairs for combination. The herein described heat sealing is a kind of welding. Heating sources for welding or sealing can be provided by hot air, heat conduction, infrared irradiation, mechanical friction, ultra sonic exposure, or high frequency. Heat welding systems, for example, hand held systems like TRIAC-S from LEISTER (Switzerland), are in common use for the welding of building and construction membranes. For thermoplastic olefins, set temperatures in the range of 280 to 400° C. are taken for heat welding. The common test method for olefins is to clean the sample surfaces with acetone and then weld the samples over a width of 5 cm. Sample stripes of "1.5 cm width by 150 mm length" were cut perpendicular to the weld seam, and over the seam (joined membranes—overlapping stream in middle of strip). After 24 hours of storage at ambient conditions, tensile/tear tests over the welded stripes were performed. The requirement in building and construction is thereby, that failure of the sample has to occur in the sheet area, and not in the welding seam. Peeling of the seam is not tolerated.

GPC

The molecular weight distributions for the ethylene-based resins can be determined with a chromatographic system consisting of either a Polymer Laboratories Model PL-210 or a Polymer Laboratories Model PL-220. The column and carousel compartments are operated at 140° C. The columns are three Polymer Laboratories 10-micron Mixed-B columns. The solvent is 1,2,4 trichlorobenzene. The samples are prepared at a concentration of 0.1 grams of polymer in 50 milliliters of solvent. The solvent used to prepare the samples contains 200 ppm of butylated hydroxytoluene (BHT). Samples are prepared by agitating lightly for two hours at 160° C. The injection volume is 100 microliters and the flow rate is 1.0 milliliters/minute.

A fifth-order polynomial fit of the calibration of the gel permeation chromatography (GPC) column set, is performed with 21 narrow molecular weight distribution polystyrene standards with molecular weights ranging from 580 to 8,400,000, arranged in 6 "cocktail" mixtures, with at least a decade of separation between individual molecular weights. The standards are purchased from Polymer Laboratories (UK). The polystyrene standards are prepared at 0.025 grams in 50 milliliters of solvent for molecular weights equal to, or greater than, 1,000,000, and at 0.05 grams in 50 milliliters of solvent for molecular weights less than 1,000,000. The polystyrene standards are dissolved at 80° C., with gentle agitation for 30 minutes. The narrow standards mixtures are run first, and in order of decreasing highest molecular weight component, to minimize degradation. The polystyrene standard peak molecular weights are converted to polyethylene molecular weights using the following equation (as described in Williams and Ward, J. Polym. Sci., Polym. Let., 6, 621 (1968)):

$$M_{polyethylene} = A \times (M_{polystyrene})^B,$$

where M is the molecular weight, A has a value of 0.4315 and B is equal to 1.0. Polyethylene equivalent molecular weight calculations are performed using Viscotek TriSEC software Version 3.0. The molecular weights for polypropylene-based polymers can be determined using Mark-Houwink ratios according to ASTM D6474.9714-1, where, for polystyrene, a=0.702 and log K=−3.9, and for polypropylene, a=0.725 and log K=−3.721. For polypropylene-based samples, the column and carousel compartments are operated at 160° C.

DSC

Differential Scanning calorimetry (DSC) can be used to measure crystallinity in ethylene-based (PE) samples and propylene-based (PP) samples. A sample is pressed into a thin film at a temperature of 190° C. About 5 to 8 mg of film sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C/min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (e.g., % cryst.=($H_f$/292 J/g)×100).

The melting point(s) (Tm) of the polymers can be determined from the second heat curve obtained from DSC, as described above. The crystallization temperature (Tc) can be determined from the first cooling curve.

The films and processes of this invention, and their use, are more fully described by the following examples. The following examples are provided for the purpose of illustrating the invention, and are not to be construed as limiting the scope of the invention.

Experimental

The following resins were used individually, or as a composition component, in the experimental compositions. These resins are preferably compounded with one or more stabilizers and/or antioxidants.

D56 a linear, low density ethylene-based copolymer, prepared using a Ziegler-Natta type catalyst, and a solution polymerization process. This copolymer has a density of 0.917-0.921 g/cc (ASTM D792-00) and a melt index ($I_2$) of 0.9-1.2 g/10 min (190° C./2.16 kg, ASTM D1238-04). Comonomer=1-octene.

E62 is an enhanced (composite) ethylene-based copolymer with a density of 0.939-0.943 g/cc (ASTM D792-00). Comonomer=1-octene.

E54 is an enhanced (composite) ethylene-based copolymers with a density of 0.914-0.918 g/cc (ASTM D792-00) and a melt index ($I_2$) of 0.8-1.2 g/10 min (190° C./2.16 kg, ASTM D1238-04). Comonomer=1-octene.

P30 a propylene/ethylene copolymer with an overall density of 0.87-0.89 g/cc (ASTM D792-00) and a melt flow rate (MFR) of 6.4-9.6 g/10 min (230° C./2.16 kg, ASTM D1238-04). Comonomer=ethylene.

E20 an ethylene/propylene/ENB terpolymer with an overall melt index (I2) of 0.75-1 g/10 min (190° C./2.16 kg, ASTM D1238-04).

The following compositions were used to prepare films for testing.
Composition 1: 100 weight percent E62
Composition 2: 100 weight percent E54
Composition 3: 100 weight percent P30
Composition 4: 90 weight percent D56 and 10 weight percent E20

The film fabrication conditions are as follows: The individual sample compositions were extruded through a 60 mm, single screw extruder (NOKIA NM B60-30D) into a blown film head, with a die diameter of 200 mm, and a die gap of 0.25 mm.

Film production conditions are shown in Table 2.

TABLE 2

Film Production Conditions

| | Unit | Composition 1 | Composition 2 | Composition 3 | Composition 4 |
|---|---|---|---|---|---|
| Extruder output | Kg/h | 90 | 90 | 70 | 90 |
| Blow-up ratio | — | 2.5 | 2.5 | 2.5 | 2.5 |
| Take-up speed | m/min | 20.3 | 20.8 | 16.8 | 20.8 |
| Film thickness | microns | 50 | 50 | 50 | 50 |

The temperature settings were as follows for Compositions 1, 2 and 4:
Barrel zones [degC]: 60, 180, 200, 210, 210,
Adapter and screen changer [degC]: 210, 210, 210, 210, and
Die zones [degC]: 210, 210, 215, 215.

The temperature settings were as follows for Composition 3:
Barrel zones [degC]: 50, 150, 170, 170, 170,
Adapter and screen changer [degC]: 170, 170, 170, 170, and
Die zones [degC]: 170, 170, 170, 170.

After the film production, rectangular sheet samples were cut and electron radiation (e-beam) crosslinked on a laboratory radiation unit from ENERGY Science Incorporated. The e-beam voltage was set to 150 KeV, and the exposure time under the beam was set to following radiation dose levels: 50, 100, 150 and 200 kGy (1 kGy=0.1 MRAD). Alternatively, for three dimensionally shaped articles, y-radiation can be used which has a higher penetration depths.

Each film was tested for Hot Set. Test conditions and results are shown in Tables 3 and 4.

TABLE 3

Hot Set Testing (ISO 60811-2-1)

| | |
|---|---|
| Sample Thickness | 50 μm |
| Sample width | 25 mm |
| Cross-section | 1.25 mm² |
| Set temperature | 200 deg C. |
| Load application time | 5 min |
| Weight/Load | 0.2 MPa |
| or | 25 g |
| Marker Distance | 30 mm |

TABLE 4

Hot Set

| Film/Comp | Dose [kGy] | Test 1 Elong.* [mm] | Test 2 Elong.* [mm] | Test 3 Elong.* [mm] | Elong. Avg.** [mm] | Hot Set*** [%] 200° C. |
|---|---|---|---|---|---|---|
| E62/1 | 100 | 66 | 68 | 68 | 67 | 124 |
| | 150 | 44 | 48 | 48 | 47 | 56 |
| | 200 | 42 | 43 | 38 | 41 | 37 |
| E54/2 | 100 | 41 | 40 | 40 | 40 | 34 |
| | 150 | 35 | 38 | 37 | 37 | 22 |
| | 200 | 34 | 34 | 38 | 35 | 18 |
| P30/3 | 100 | Melt | Melt | No test | NA | NM |
| | 150 | No test | No test | No test | | |
| | 200 | | No test | No test | | |
| (90 wt % D56 and 10 wt % E20)/4 | 100 | 38 | 38 | 38 | 38 | 27 |
| | 150 | 36 | 36 | 36 | 36 | 20 |
| | 200 | 36 | 36 | 38 | 37 | 22 |

*Elongation = initial length (30 mm) plus amount of elongation
**Average elongation
***Percent Hot Set = [(average elongation − 30 mm)/30 mm] × 100
NA = Not Applicable
NM = Not Measured The results show improved heat resistance due to crosslinking, as indicated by the retention of mechanical strength (elongation) at the hot set test temperature of 200° C. The intermolecular network, generated by crosslinking, prevents the melting of the material, and leads to rubber like characteristic. The denser the intermolecular network, the lower the elongation at the test temperature. Property improvements include higher heat resistance with the good heat sealability (unexpected for highly crosslinked olefins). The films have good heat resistance like crosslinked products. A summary of the heat seal properties are shown in Table 5.

TABLE 5

Heat Seal Summary

Figure 2:
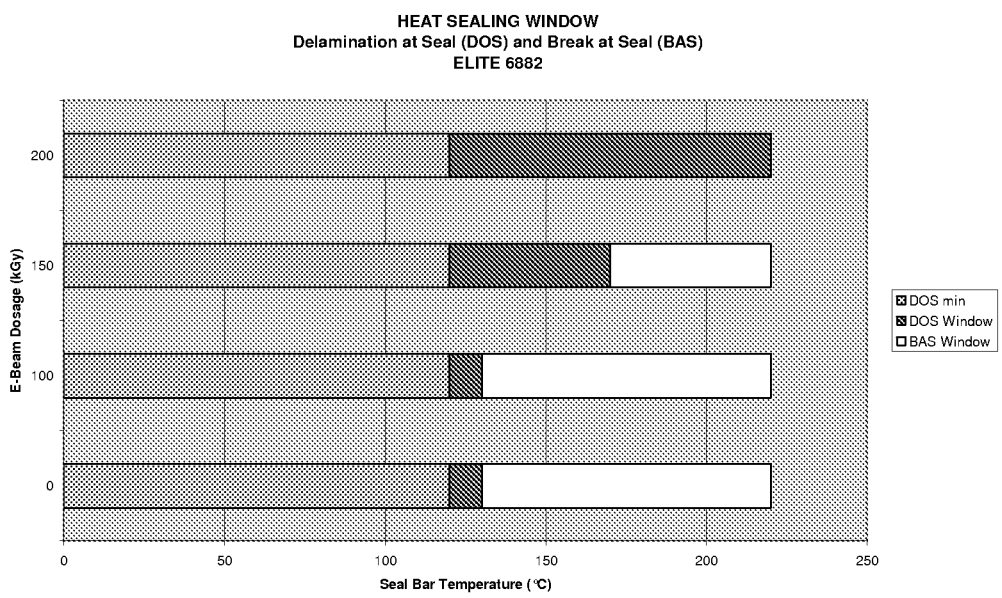
FIG. 2 depicts the Heat Sealing Window (as referenced by Delamination at Seal (DOS) and Break at Seal (BAS)) for a given E-beam dosage of a film formed from a composition comprising the E62 polymer.
Figure 3:
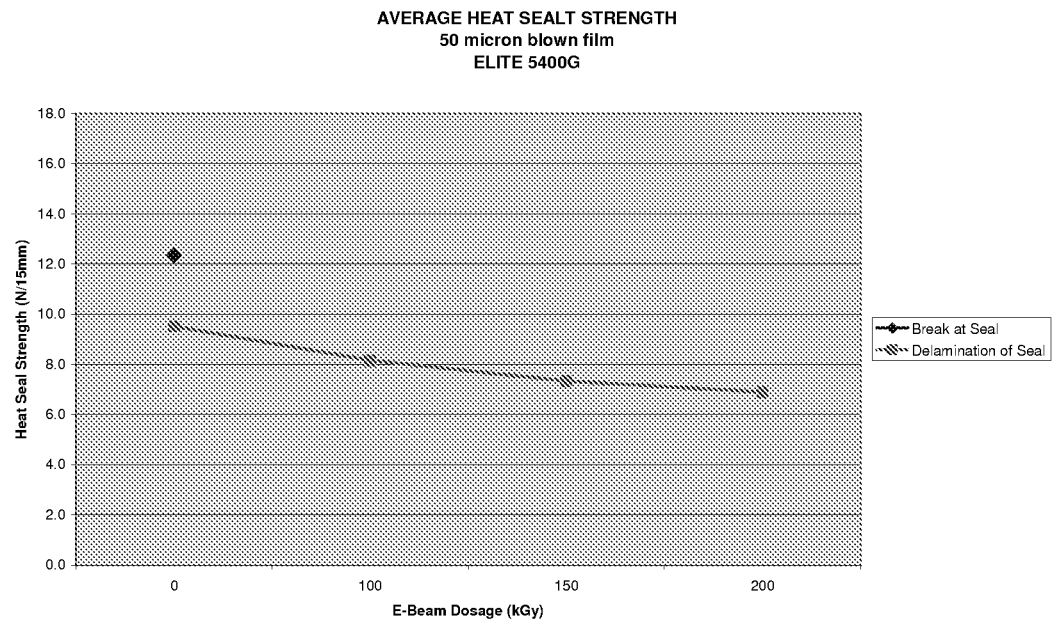
FIG. 3 depicts the Average Heat Seal Strength (as referenced by Delamination at Seal (DOS) and Break at Seal (BAS)) versus E-Beam dosage of a film formed from a composition comprising the E54 polymer.
Figure 4:
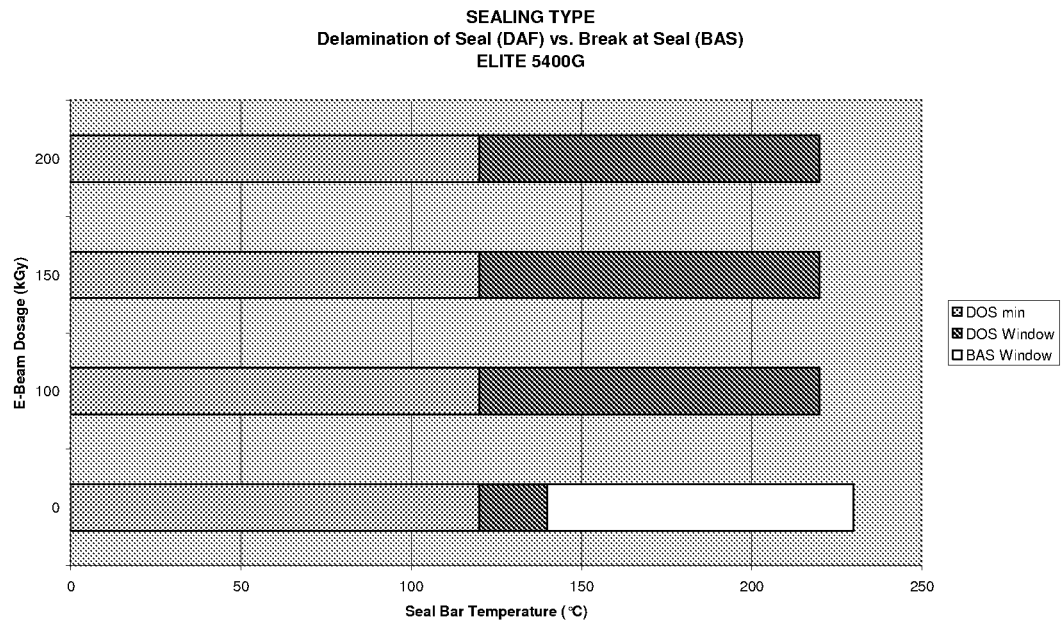
FIG. 4 depicts the Heat Sealing Window (as referenced by Delamination at Seal (DOS) and Break at Seal (BAS)) for a given E-beam dosage of a film formed from a composition comprising the E54 polymer.
Figure 5:
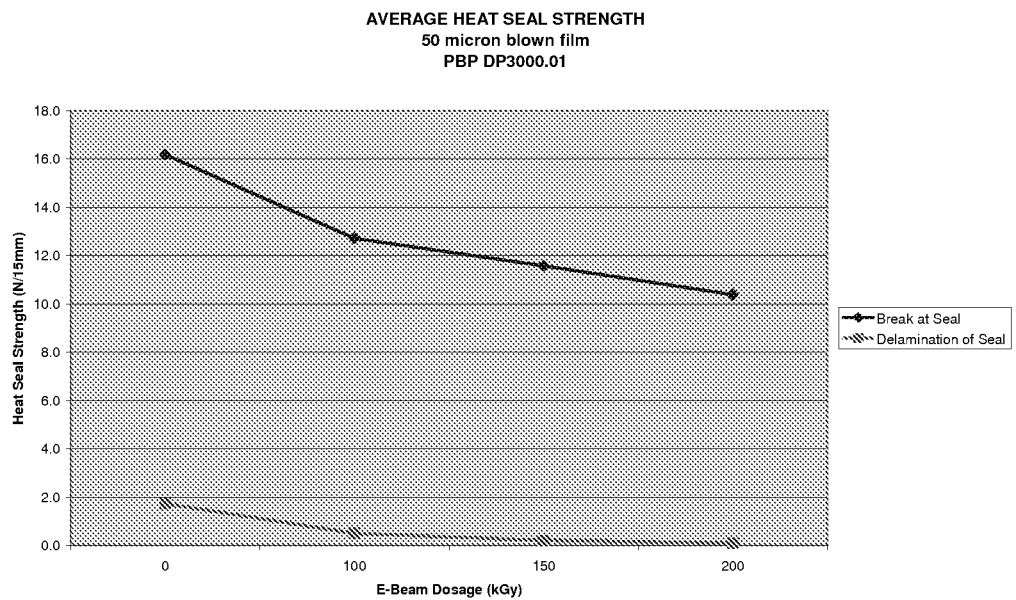
FIG. 5 depicts the Average Heat Seal Strength (as referenced by Delamination at Seal (DOS) and Break at Seal (BAS)) versus E-Beam dosage of a film formed from a composition comprising the P30 polymer.
Figure 6:
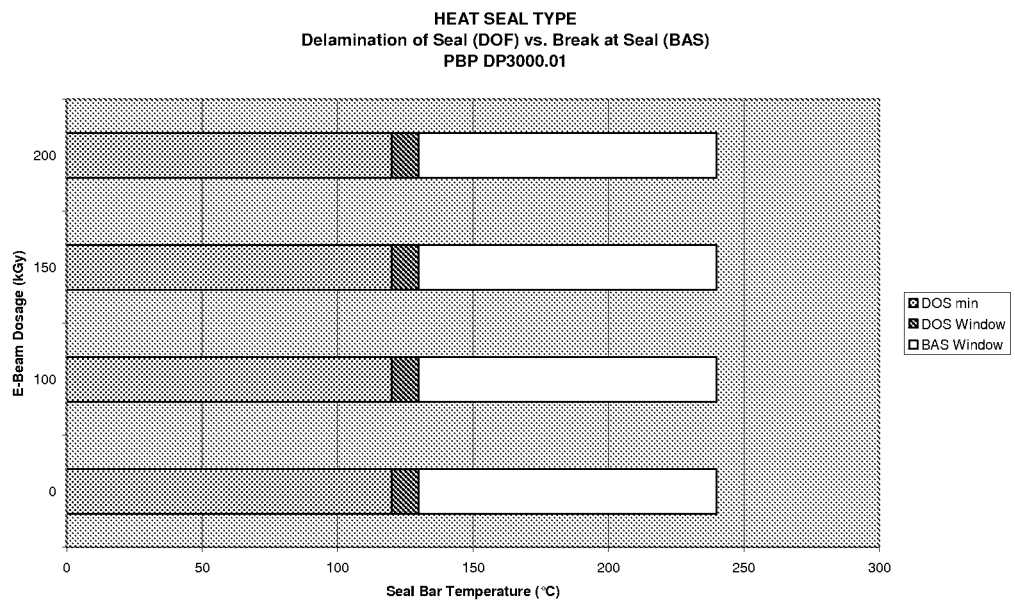
FIG. 6 depicts the Heat Sealing Window (as referenced by Delamination at Seal (DOS) and Break at Seal (BAS)) for a given E-beam dosage of a film formed from a composition comprising the P30 polymer.
Figure 7:
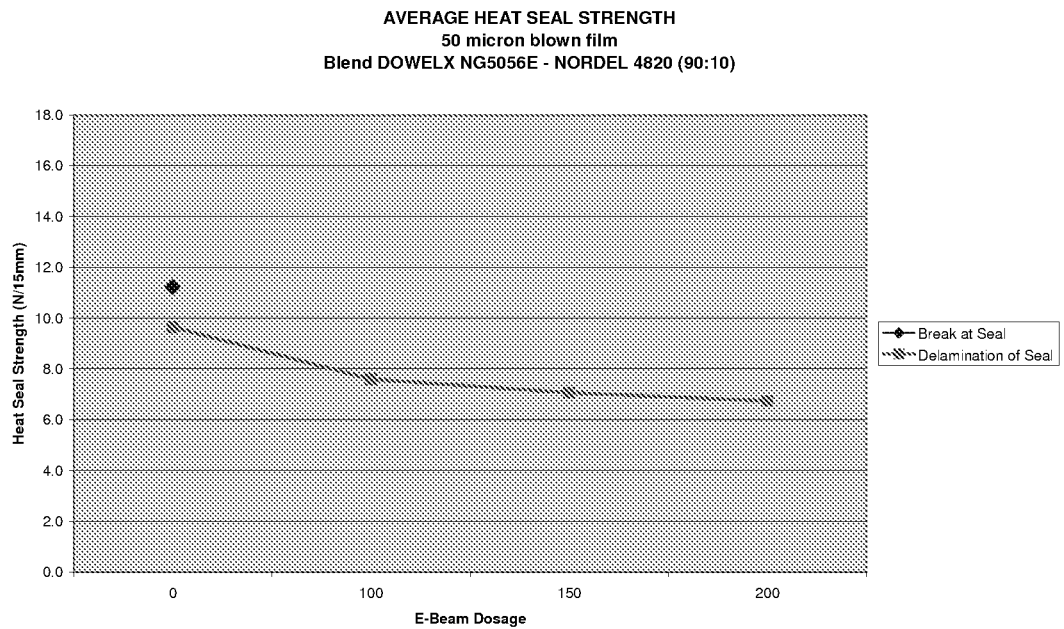
FIG. 7 depicts the Average Heat Seal Strength (as referenced by Delamination at Seal (DOS) and Break at Seal (BAS)) versus E-Beam dosage of a film formed from a composition comprising the E20 polymer.
Figure 8:
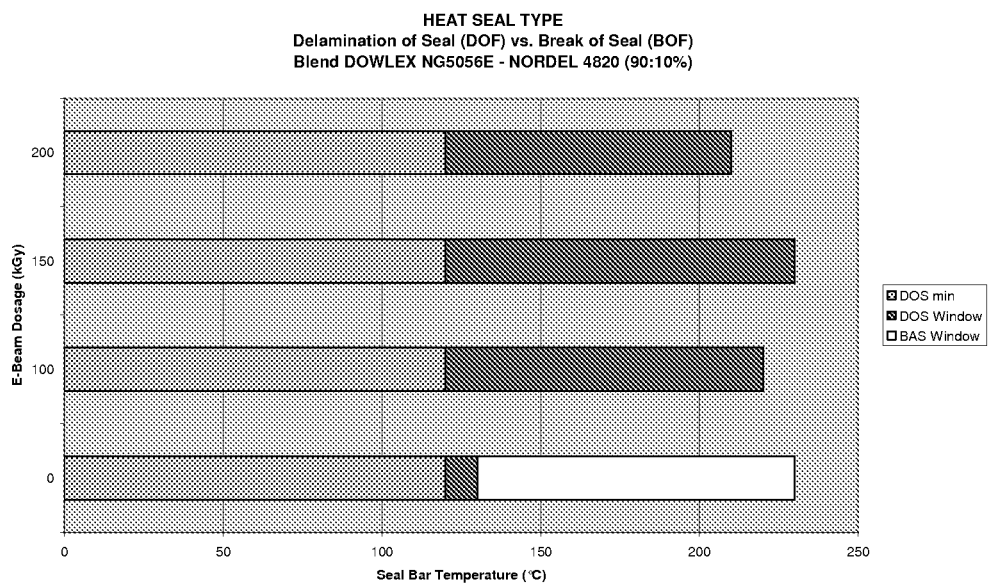
FIG. 8 depicts the Heat Sealing Window (as referenced by Delamination at Seal (DOS) and Break at Seal (BAS)) for a given E-beam dosage of a film formed from a composition comprising the E20 polymer.

| Composition | Heat Seal reference | Delamination of Seal | Break at Seal |
|---|---|---|---|
| 1 | FIG. 1-2 | Partial | Partial |
| 2 | FIG. 3-4 | Partial | Partial |
| 3 | FIG. 5-6 | Not applicable | Full range |
| 4 | FIG. 7-8 | Partial | Partial |

The results from the heat seal testing are shown in FIGS. 1-8 and are summarized in above Table 5. FIG. 1 shows the average heat seal strength for a 50 micron blown film formed from E62. FIG. 2 shows the Delamination at seal (DOS) and Break at seal (BAS) for this film.

FIG. 3 shows the average heat seal strength for a 50 micron blown film formed from E54. FIG. 4 shows the Delamination at seal (DOS) and Break at seal (BAS) for this film.

FIG. 5 shows the average heat seal strength for a 50 micron blown film formed from P30. FIG. 6 shows the Delamination at seal (DOS) and Break at seal (BAS) for this film.

FIG. 7 shows the average heat seal strength for a 50 micron blown film formed from the E56 (90 wt %) and E20 (10 wt %) composition. FIG. 8 shows the Delamination at seal (DOS) and Break at seal (BAS) for this film.

In another study, the formulations shown in Table 6 were extruded into flexible sheets and membranes.

The formulation components listed in Table 6 are as follows:

N25P: Ethylene-Propylene-ENB terpolymer (ML 1+4 @ 125° C. from 21 to 29) from The DOW Chemical Company PE42: propylene-ethylene copolymer (density from 0.874-0.878 g/cc; MFR from 21-29 g/10 min) from The DOW Chemical Company IRGANOX B225: phenolic process stabilizer from CIBA Geigy AG CHIMASORB 2020: hindered amine light stabilizer from CIBA Geigy AG KRONOS 2020: titanium dioxide from KRONOS International, Inc.

MARTINAL OL-104 LEO: aluminumtrihydrate flame retardant from Martinswerk GmbH

TABLE 6

Formulation for direct extrusion membrane studies.

| FORMULATIONS in [phr] | Polymers | | POLYMERS = 100 PHR | ADDITIVES | | | MARTINAL OL 102 LEO (Flame retardant) | ADDITIVES [phr] |
|---|---|---|---|---|---|---|---|---|
| | N25P | PE42 | | IRGANOX B225 | CHIMASORB 2020 | KRONOS 2020 | | |
| 1 | 70.0 | 30.0 | 100 | 0.30 | 0.75 | 2.0 | 90.0 | 93 |
| 2 | 70.0 | 30.0 | 100 | 0.30 | 0.75 | 2.0 | | 3 |
| 3 | 60.0 | 40.0 | 100 | 0.30 | 0.75 | 2.0 | 90.0 | 93 |
| FORMULATIONS in wt %] | | | | | | | | [wt %] |
| 1 | 36.3 | 15.5 | | 0.2 | 0.4 | 1.0 | 46.6 | 100 |
| 2 | 67.9 | 29.1 | | 0.3 | 0.7 | 1.9 | | 100 |
| 3 | 31.1 | 20.7 | | 0.2 | 0.4 | 1.0 | 46.6 | 100 |

Figure 9:
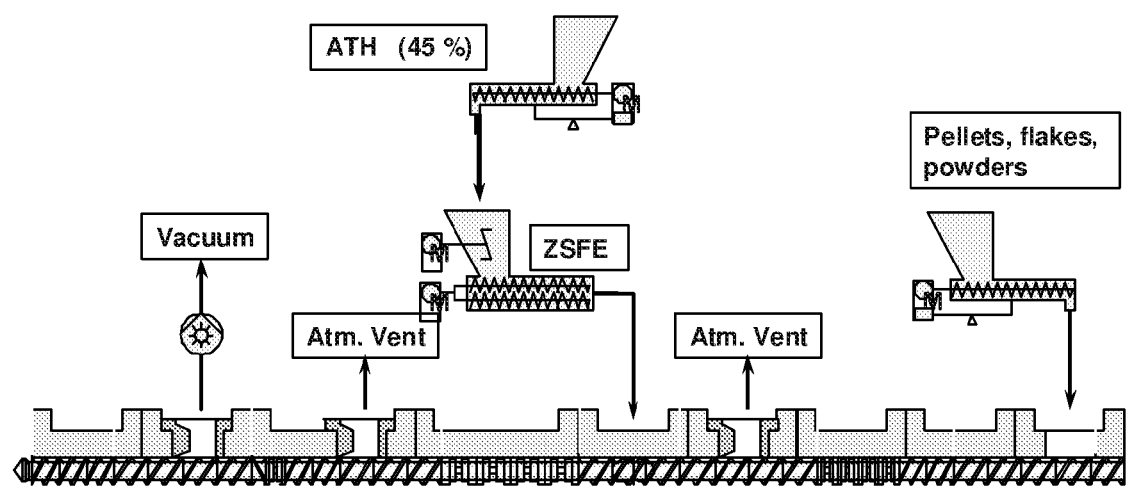
FIG. 9 depicts a direct extrusion design for flexible, flame retardant membranes.

These formulations were processed in direct extrusion on a co-rotating twin-screw extruder into flexible membranes of 1.5 mm thickness. FIG. 9 shows the extruder feeding and compounding design. The polymers and stabilizers were fed into the first hopper of a 60 mm twin screw extruder, with an L/D-ratio of 42 D. The free flowing aluminumtrihydrate powder was subsequently fed by a side feed extruder into the molten polymer and intensively blended. After degassing, the polymer melt was fed by a gear pump through a 700 mm flat slit die and shaped on a three roll calander stack.

The process settings and process parameters to these studies are given in Tables 7A and 7B. These formulations processed easily.

TABLE 7A

Machine Settings

| Screw speed [rpm] | Total output [kg/h] | Screw speed gear pump [rpm] | Barrel temp zone 1 [° C.] | Barrel temp zone 2 - Gear pump [° C.] | Gear pump temp [° C.] | Die adapter temp [° C.] | Die temp 1-3 [° C.] |
|---|---|---|---|---|---|---|---|
| 100 | 250 | 43 | 24 | 180 | 200 | 180 | 190 |

TABLE 7B

| | | | Process Response | | | |
|---|---|---|---|---|---|---|
| Screw torque % | Motor load [KW] | Melt temp machine melt gauge [° C.] | Melt temp. IR Thermo-couple [° C.] | Pressure at screw tip [bar] | Pressure at gear pump [bar] | Die pressure [bar] |
| 75 | 25 | 184 | 200 | 45 | 5 | 118 |

After the membrane production, "28 cm by 20 cm" rectangular sheet samples were cut and crosslinked using electron radiation (e-beam) under various conditions. Table 8 gives an overview to the radiation trial and hot set and welding results.

The radiation was done using two e-beaming units with different radiation conditions. At Leoni-Studer AG (Koelliken Switerland), the e-beam voltage was set to a level of 1 MeV (1000 keV) to insure a constant irradiation and crosslinking over the membrane thickness. The exposure time in e-beaming was set such, that radiation doses of 25 to 125 kGy were achieved.

Selected samples were radiated by ENERGY SCIENCE, at a set voltage of 175 keV. The exposure time was set in such a way, that doses of 100 to 200 kGy were achieved. This setting embodies an interesting aspect, as the radiation voltage of 175 keV will not be sufficient to provide a full penetration of the membranes by the e-beams, but only up to roughly the middle of the membrane. This results in a variable crosslink density as function of the sheet thickness, meaning a highly crosslinked surface is achieved while the bottom of the membrane stays uncrosslinked, i.e. thermoplastic. It was found that membranes radiated under these conditions show excellent heat resistance at the surface, in combination with excellent heat welding behavior when welding the radiated crosslinked surface with the thermoplastic surface. Another benefit of such low voltage e-beaming is that the radiation treatment can be favorable done in-line with a membrane shaping process using low cost e-beaming facilities.

Table 8 also shows the resulting hot set data. As expected, samples from virgin material do melt and show no hot set. With increasing radiation dose [kGy] the samples display higher heat resistance or crosslink level, expressed by lower hot set values. It is also evident, that samples with a higher EPDM content show a higher crosslink response to radiation. The amount of crosslinking in an invented formulations can be adjusted by the crosslink level and also by formulation. It is also seen, that even with filler loadings of up to 90 phr, crosslinking occurs at high rates and with good adjustability.

The last column of Table 8 gives the results of heat weld tests. The sample sheets were heat welded, according to common building and construction practice, with a LEISTER TRIAC-S heat welding system. The surfaces of the sample sheets were pre-cleaned with acetone and heat welded using a 20 mm wide die nozzle, at a welder set temperature of 320° C. The samples were stored at ambient conditions for 24 hours, and "1.5 cm wide" test pieces were cut perpendicular to the welding seam and tensile tested. Samples were rated satisfactory, as is common practice for building and construction applications, when failure of the samples occurred outside of the welded seam (break at seal).

Table 8 shows, for the formulations with a 60/40 N25/P42 ratio, that the welding properties are excellent for any of the chosen radiation conditions. Though the formulations display the hot set of thermoset materials, they can still be heat welded with excellent welding strength. Formulations with a 70/30 N25/P42 ratio show good welding up to 50 kGy radiation. Above this dose, the crosslink density of the intermolecular network becomes too dense, as also indicated by the hot set data, and the formulations loose weldability. These results outline the processing and formulation window of the invention, and demonstrate the broad spectrum of novel filled and unfilled formulations that are favorably heat weldable while actually having a thermoset backbone.

TABLE 8

Hot Set and Welding Studies on Extruded Membranes

| Run/Formulation # | N25P/PE42 Ratio | Flame Retardant | Radiation Unit | Radiation Voltage [keV] | Radiation Dose [kGy] | Hot Set (200° C., 20 N/cm 2.15 min) [%] | Welding performance: pass = failure outside of weld seam |
|---|---|---|---|---|---|---|---|
| 1 | 70/30 | Yes | VIRGIN | | | Break | pass |
| 1 | 70/30 | Yes | LEONI-STUDER | 1000 | 25 | 400 | pass |
| 1 | 70/30 | Yes | LEONI-STUDER | 1000 | 50 | 50 | pass |
| 1 | 70/30 | Yes | LEONI-STUDER | 1000 | 75 | 30 | fail |
| 1 | 70/30 | Yes | LEONI-STUDER | 1000 | 100 | 20 | fail |
| 1 | 70/30 | Yes | LEONI-STUDER | 1000 | 125 | 20 | fail |
| 2 | 70/30 | No | VIRGIN | | | Break | pass |
| 2 | 70/30 | No | LEONI-STUDER | 1000 | 25 | Break | pass |
| 2 | 70/30 | No | LEONI-STUDER | 1000 | 50 | 70 | pass |

TABLE 8-continued

Hot Set and Welding Studies on Extruded Membranes

| Run/Formulation # | N25P/PE42 Ratio | Flame Retardant | Radiation Unit | Radiation Voltage [keV] | Radiation Dose [kGy] | Hot Set (200° C., 20 N/cm$^2$ 2.15 min) [%] | Welding performance: pass = failure outside of weld seam |
|---|---|---|---|---|---|---|---|
| 2 | 70/30 | No | LEONI-STUDER | 1000 | 75 | 50 | fail |
| 2 | 70/30 | No | LEONI-STUDER | 1000 | 100 | 40 | fail |
| 2 | 70/30 | No | LEONI-STUDER | 1000 | 125 | 40 | fail |
| 3 | 60/40 | Yes | VIRGIN | | VIRGIN | Break | pass |
| 3 | 60/40 | Yes | ENERGY SCIENCE | 175 | 100 | | pass |
| 3 | 60/40 | Yes | ENERGY SCIENCE | 175 | 140 | | pass |
| 3 | 60/40 | Yes | ENERGY SCIENCE | 175 | 200 | | pass |
| 3 | 60/40 | Yes | LEONI-STUDER | 1000 | 25 | Break | pass |
| 3 | 60/40 | Yes | LEONI-STUDER | 1000 | 50 | 220 | pass |
| 3 | 60/40 | Yes | LEONI-STUDER | 1000 | 75 | 85 | pass |
| 3 | 60/40 | Yes | LEONI-STUDER | 1000 | 100 | 45 | pass |
| 3 | 60/40 | Yes | LEONI-STUDER | 1000 | 125 | 25 | pass |

What is claimed:

1. A film comprising at least one layer formed from a composition comprising the following components:
   A) at least one polymer selected from the group consisting of the following:
      i) an ethylene-based polymer,
      ii) an ethylene/α-olefin/diene interpolymer, and
      iii) a C4-C10 olefin-based polymer;
   B) a propylene/ethylene interpolymer that has a density from 0.86 g/cc to 0.93 g/cc and a melt flow rate from 0.1 to 100 g/10 min; and
   wherein the film is crosslinked using electron beam radiation at a dosage from 5 kGy to 400 kGy; and
   wherein Component B is a propylene/ethylene interpolymer, and wherein the propylene/ethylene interpolymer comprises from 70 to 96 weight percent polymerized propylene, based on the total weight of interpolymer, and from 4 to 30 weight percent polymerized ethylene, based on the total weight of interpolymer.

2. The film of claim 1, wherein Component B is present in an amount from 5 to 50 weight percent, based on the total weight of the composition.

3. The film of claim 2, wherein Component A is present in an amount from 50 to 95 weight percent, based on the total weight of the composition.

4. The film of claim 1, wherein Component A is an ethylene-based polymer.

5. The film of claim 1, wherein Component A has a density from 0.850 g/cc to 0.965 g/cc.

6. The film of claim 4, wherein Component A has a melt index (I2) from 0.5 g/10 min to 40 g/10 min.

7. The film of claim 1, wherein the Component A is an ethylene/α-olefin/diene interpolymer.

8. The film of claim 7, wherein the ethylene/α-olefin/diene interpolymer has a density from 0.85 g/cc to 0.91 g/cc.

9. The film of claim 7, wherein the ethylene/α-olefin/diene interpolymer has a melt index (I2) from 0.5 g/10 min to 40 g/10 min.

10. The film of claim 1, wherein the film is crosslinked with an E-beam radiation, set at a voltage from 50 keV to 5 MeV.

11. The film of claim 1, wherein the film has a hot set elongation value from 10 percent to 200 percent.

12. The film of claim 1, wherein the film has a hot set from 0 percent to 200 percent.

13. The film of claim 1, wherein the film has a seal strength greater than, or equal to, 10 N/15 mm.

14. An article comprising the film of claim 1.

15. The article of claim 14, wherein the article is a sheet, a carpet, an adhesive, a wire sheath, a cable, a coated fabric, an automotive part, a footwear component, a coating, a coated article, a laminated article, a foam laminate, an automotive skin, a leather article, a roofing construction article, a waterproofing membrane, an artificial leather, an artificial turf, a consumer durable, a computer component, a belt, a fiber, or a fabric.

* * * * *